United States Patent
Kitakado et al.

(10) Patent No.: US 6,931,244 B2
(45) Date of Patent: Aug. 16, 2005

(54) RADIO EQUIPMENT CAPABLE OF REAL TIME CHANGE OF ANTENNA DIRECTIVITY AND DOPPLER FREQUENCY ESTIMATING CIRCUIT USED FOR THE RADIO EQUIPMENT

(75) Inventors: Jun Kitakado, Hashima (JP); Yoshiharu Doi, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 701 days.

(21) Appl. No.: 09/911,823

(22) Filed: Jul. 25, 2001

(65) Prior Publication Data

US 2002/0032015 A1 Mar. 14, 2002

(30) Foreign Application Priority Data

Jul. 27, 2000 (JP) ........................................ 2000-226967
Aug. 3, 2000 (JP) ........................................ 2000-235589

(51) Int. Cl.[7] .............................. H04B 1/06; H04B 1/38
(52) U.S. Cl. .................................. 455/277.1; 455/562.1
(58) Field of Search ........................ 342/367; 455/13.3, 455/63.4, 62.1, 101, 272, 275, 276, 277.1, 562.1

(56) References Cited

U.S. PATENT DOCUMENTS

| | | | |
|---|---|---|---|
| 5,809,422 A | * | 9/1998 | Raleigh et al. ............. 455/449 |
| 6,006,110 A | * | 12/1999 | Raleigh ....................... 455/561 |
| 6,075,991 A | * | 6/2000 | Raleigh et al. ............. 455/450 |
| 6,140,961 A | | 10/2000 | Takai ........................... 342/367 |

FOREIGN PATENT DOCUMENTS

| | | |
|---|---|---|
| EP | 0 869 578 | 10/1996 |
| EP | 0 756 430 | 1/1997 |
| JP | 7-162360 | 6/1995 |
| JP | 2000-22612 | 1/2000 |
| KR | 1999-0083110 | 11/1999 |
| WO | WO 97/00543 | 1/1997 |
| WO | WO 98/18271 | 4/1998 |
| WO | WO 00/79702 A1 | 12/2000 |

OTHER PUBLICATIONS

B. Widrow et al.; Proceedings of the IEEE, vol. 55, No. 12, pp. 2143–2159, Dec. 1967.
S. P. Applebaum; IEEE Transactions on Antennas and Propagation, vol. AP–24, No. 5, pp. 585–598; Sep. 1976.
B. Widrow et al.; Adaptive Signal Processing, Chapter 6, pp. 99–116; 1985.
R. A. Monzingo et al; Introduction to Addaptive Arrays; Chapter 3, pp. 78–105; 1980.
R. T. Compton, Jr.; Adaptive Antennas, Prentice Hall; pp. 6–11; 1988.
E. Nicolau et al; Adaptive Arrays; Chapter 8; pp. 122–163; Elsevier; 1989.
J. E. Hudson, Adaptive Array Principles; Chapter 3, pp. 59–154; 1981.

* cited by examiner

*Primary Examiner*—Benny Tieu
(74) *Attorney, Agent, or Firm*—Armstrong, Kratz, Quintos, Hanson & Brooks, LLP.

(57) ABSTRACT

A radio equipment separates a signal from a specific terminal among signals from adaptive array antennas, based on a reception weight vector calculated by a reception weight vector calculator. A reception response vector calculator draws out a reception response vector of a propagation path of the signal from the specific terminal. A correlation operation and Doppler frequency estimating circuit calculates a correlation value between reception response vectors of corresponding slots of continuous frames, and estimates a corresponding Doppler frequency based on a correspondence found in advance. A transmission response vector estimator predicts a transmission response vector, by performing an extrapolation process in accordance with the estimated Doppler frequency.

23 Claims, 18 Drawing Sheets

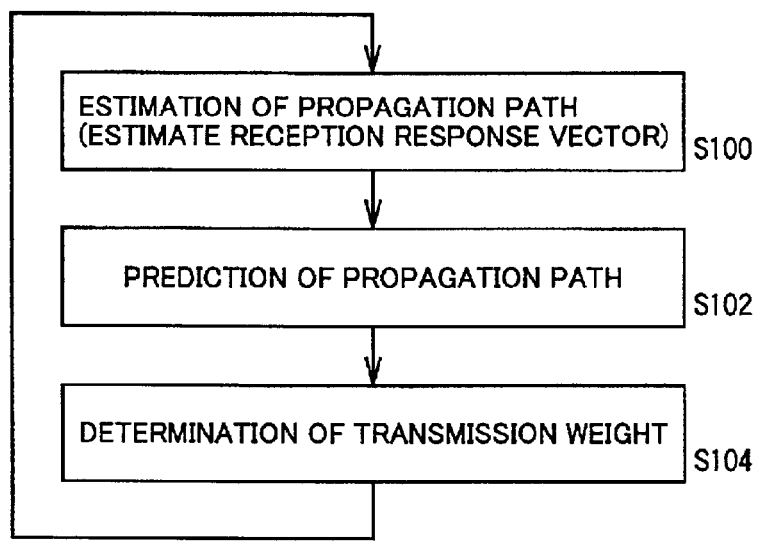
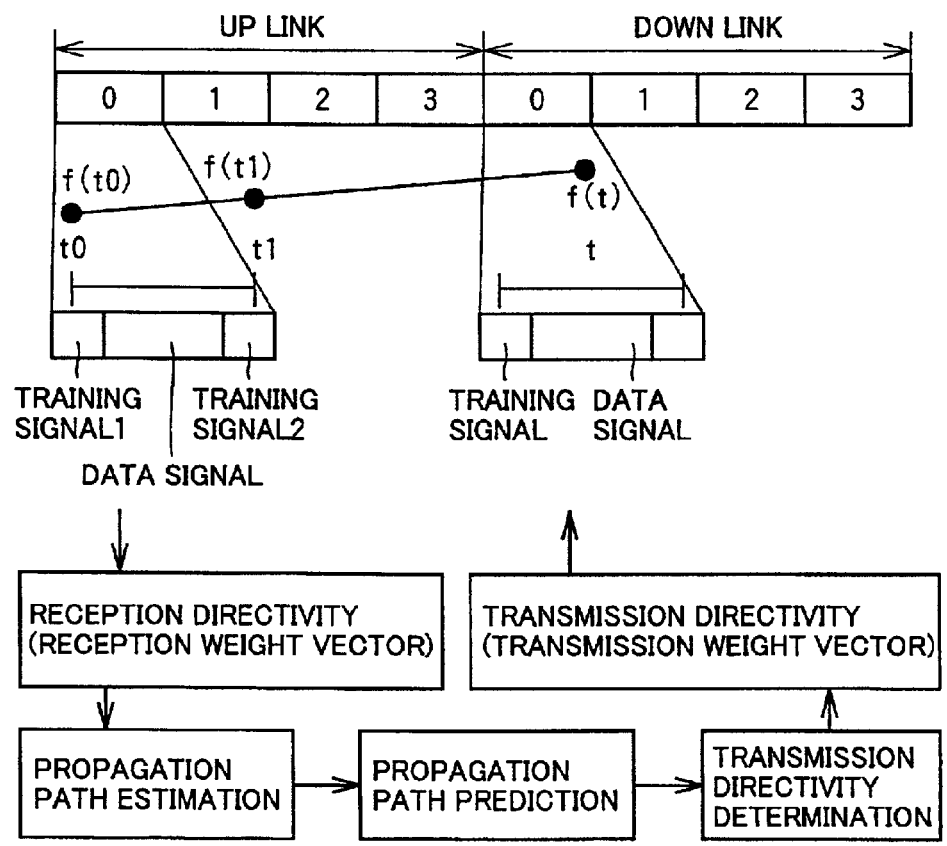

FIG. 5
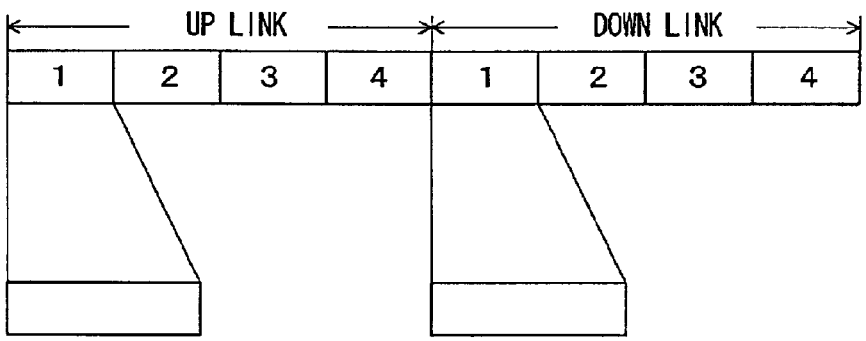
(A)
★WHEN FD IS LOW OR MSE IS LARGE
SHORTEN EXTRAPOLATION DISTANCE
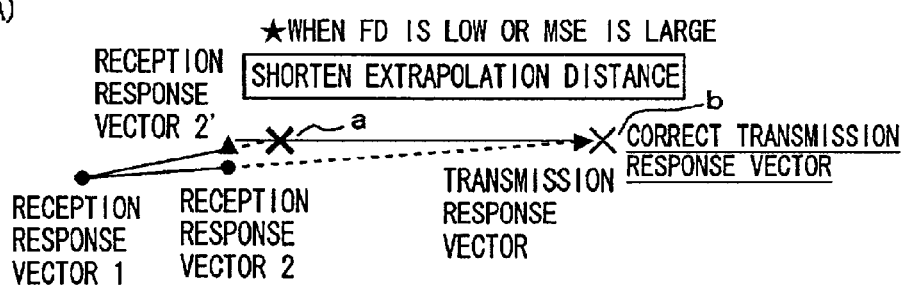
(B)
★WHEN FD IS HIGH OR MSE IS SMALL
ELONGATE EXTRAPOLATION DISTANCE
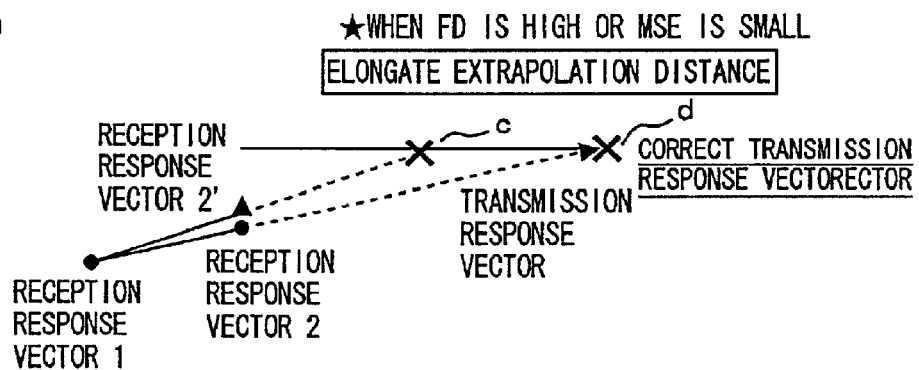

F I G. 8
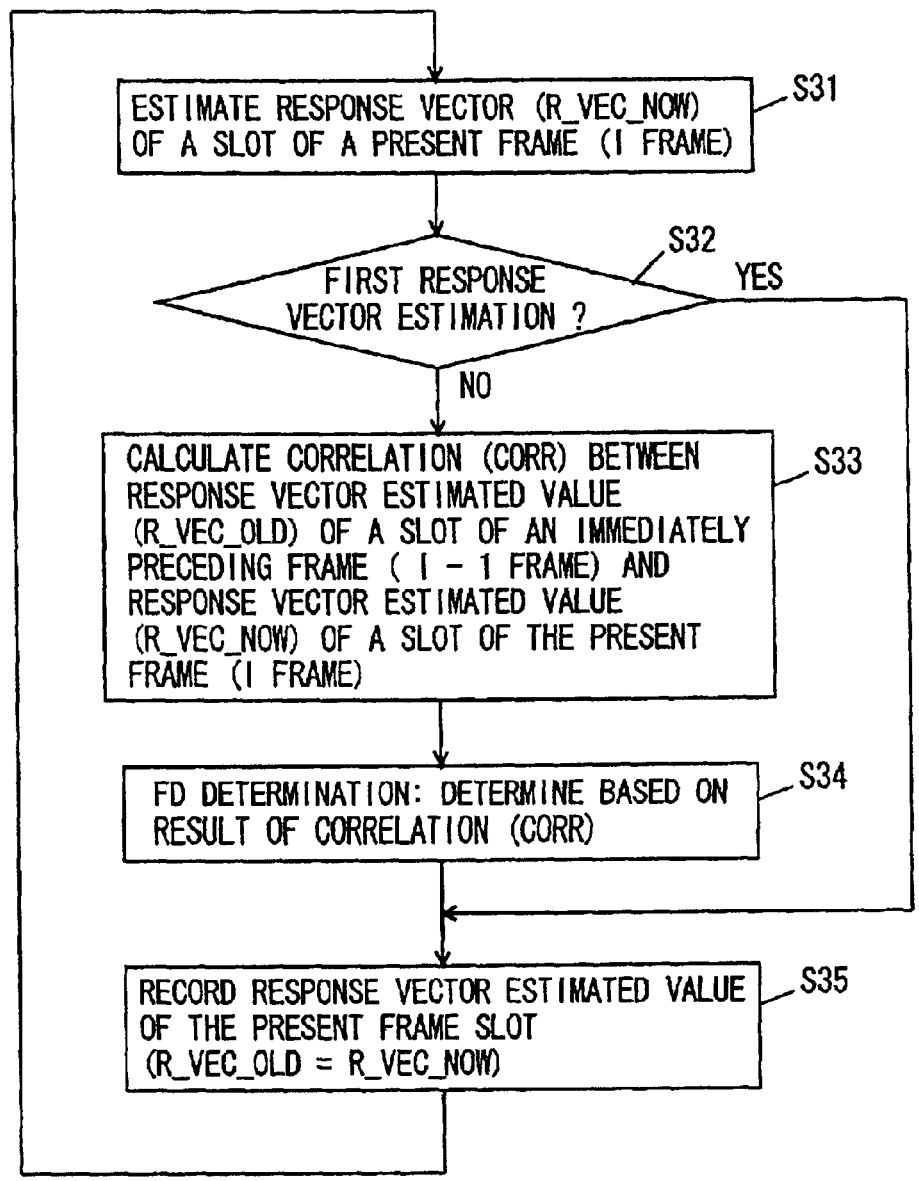

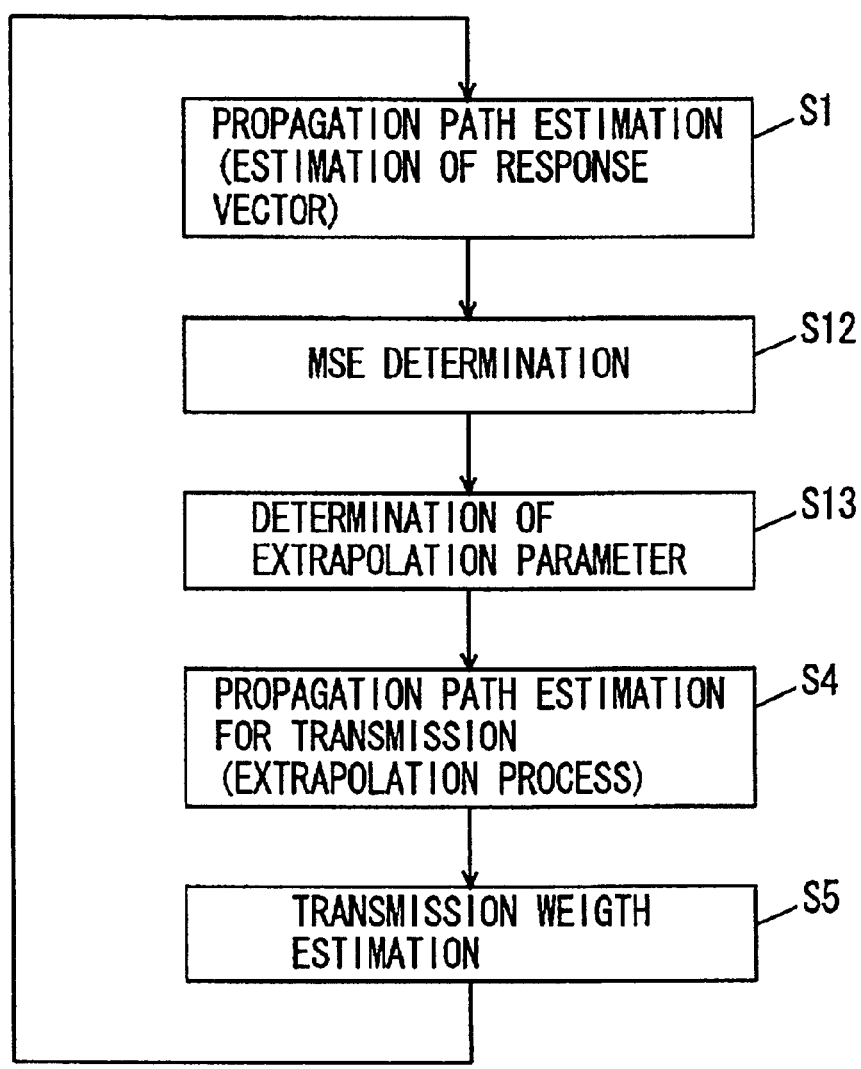
F I G. 1 3

RADIO EQUIPMENT CAPABLE OF REAL TIME CHANGE OF ANTENNA DIRECTIVITY AND DOPPLER FREQUENCY ESTIMATING CIRCUIT USED FOR THE RADIO EQUIPMENT

BACKGROUND OF THE INVENTION

1. Field of the Invention

The present invention relates to a radio equipment that can change antenna directivity on real time basis as well as to a Doppler frequency estimating circuit used therefor. More specifically, the present invention relates to a radio equipment used in an adaptive array radio base station, and to a Doppler frequency estimating circuit used therefor.

2. Description of the Background Art

Recently, various methods of transmission channel allocation have been proposed to realize effective use of frequency, in a mobile communication system, of which some have been practically implemented.

FIG. 15 shows an arrangement of channels in various communication systems including frequency division multiple access (FDMA), time division multiple access (TDMA) and path division multiple access (PDMA).

Referring to FIG. 15, FDMA, TDMA and PDMA will be briefly described. FIG. 15(A) represents FDMA in which analog signals of users 1 to 4 are subjected to frequency division and transmitted over radio waves of different frequencies f1 to f4, and the signals of respective users 1 to 4 are separated by frequency filters.

In TDMA shown in FIG. 15(B), digitized signals of respective users are transmitted over the radio waves having different frequencies f1 to f4 and time-divided time slot by time slot (time slot: a prescribed time period), and the signals of respective users are separated by the frequency filters and time-synchronization between a base station and mobile terminals of respective users.

Recently, PDMA method has been proposed to improve efficiency of use of radio frequency, as portable telephones have come to be widely used. In the PDMA method, one time slot of one frequency is spatially divided to enable transmission of data of a plurality of users, as shown in FIG. 15(C). In the PDMA, signals of respective users are separated by the frequency filters, the time synchronization between the base station and the mobile terminals of respective users, and a mutual interference eliminating apparatus such as an adaptive array.

The operation principle of such an adaptive array radio base station is described in the following literature, for example:

B. Widrow, et al.: "Adaptive Antenna Systems", Proc. IEEE, vol.55, No.12, pp.2143–2159 (December 1967).

S. P. Applebaum: "Adaptive Arrays", IEEE Trans. Antennas & Propag., vol.AP-24, No.5, pp.585–598 (September 1976).

O. L. Frost, III: "Adaptive Least Squares Optimization Subject to Linear Equality Constraints", SEL-70-055, Technical Report, No.6796-2, Information System Lab., Stanford Univ. (August 1970).

B. Widrow and S. D. Stearns: "Adaptive Signal Processing", Prentice-Hall, Englewood Cliffs (1985).

R. A. Monzingo and T. W. Miler: "Introduction to Adaptive Arrays", John Wiley & Sons, New York (1980).

J. E. Hudson: "Adaptive Array Principles", Peter Peregrinus Ltd., London (1981).

R. T. Compton, Jr.: "Adaptive Antennas—Concepts and Performance", Prentice-Hall, Englewood Cliffs (1988).

E. Nicolau and D. Zaharia: "Adaptive Arrays", Elsevier, Amsterdam (1989).

FIG. 16 is a model diagram conceptually showing the operation principle of such an adaptive array radio base station. Referring to FIG. 16, an adaptive array radio base station 1 includes an array antenna 2 formed by n antennas #1, #2, #3, . . . , #n, and a first diagonal line area 3 shows a range in which radio waves from the array antenna 2 can be received. A second diagonal line area 7 shows a range in which radio waves from adjacent another radio base station 6 can be received.

In the area 3, the adaptive array radio base station 1 transmits/receives a radio signal to/from a portable telephone 4 forming a terminal of a user A (arrow 5). In the area 7, the radio base station 6 transmits/receives a radio signal to/from a portable telephone 8 forming a terminal of another user B (arrow 9).

When the radio signal for the portable telephone 4 of the user A happens to be equal in frequency to the radio signal for the portable telephone 8 of the user B, it follows that the radio signal from the portable telephone 8 of the user B serves as an unnecessary interference signal in the area 3 depending on the position of the user B, to disadvantageously mix into the radio signal transmitted between the portable telephone 4 of the user A and the adaptive array radio base station 1.

In this case, it follows that the adaptive array radio base station 1 receiving the mixed radio signals from both users A and B in the aforementioned manner outputs the signals from the users A and B in a mixed state unless some necessary processing is performed, to disadvantageously hinder communication with the regular user A.

[Configuration and Operation of Conventional Adaptive Array Antenna]

In order to eliminate the signal from the user B from the output signal, the adaptive array radio base station 1 performs the following processing. FIG. 17 is a schematic block diagram showing the structure of the adaptive array radio base station 1.

Assuming that A(t) represents the signal from the user A and B(t) represents the signal from the user B, a signal x1(t) received in the first antenna #1 forming the array antenna 2 shown in FIG. 16 is expressed as follows:

$$x1(t) = a1 \times A(t) + b1 \times B(t)$$

where a1 and b1 represent factors changing in real time, as described later.

A signal x2(t) received in the second antenna #2 is expressed as follows:

$$x2(t) = a2 \times A(t) + b2 \times B(t)$$

where a2 and b2 also represent factors changing in real time.

A signal x3(t) received in the third antenna #3 is expressed as follows:

$$x3(t) = a3 \times A(t) + b3 \times B(t)$$

where a3 and b3 also represent factors changing in real time.

Similarly, a signal xn(t) received in the n-th antenna #n is expressed as follows:

$$xn(t) = an \times A(t) + bn \times B(t)$$

where an and bn also represent factors changing in real time.

The above factors a1, a2, a3, ..., an show that the antennas #1, #2, #3, ..., #n forming the array antenna 2 are different in receiving strength from each other with respect to the radio signal from the user A since the relative positions of the antennas #1, #2, #3, ..., #n are different from each other (the antennas #1, #2, #3, ..., #n are arranged at intervals about five times the wavelength of the radio signal, i.e., about 1 m, from each other).

The above factors b1, b2, b3, ..., bn also show that the antennas #1, #2, #3, ..., #n are different in receiving strength from each other with respect to the radio signal from the user B. The users A and B are moving and hence these factors a1, a2, a3, ..., an and b1, b2, b3, ..., bn change in real time.

The signals x1(t), x2(t), x3(t), ..., xn(t) received in the respective antennas #1, #2, #3, ..., #n are input to a receiving unit 1R forming the adaptive array radio base station 1 through corresponding switches 10-1, 10-2, 10-3, ..., 10-n respectively so that the received signals are supplied to a weight vector control unit 11 and to one inputs of corresponding multipliers 12-1, 12-2, 12-3, ..., 12-n respectively.

Weights w1, w2, w3, ..., wn for the signals x1(t), x2(t), x3(t), ..., xn(t) received in the antennas #1, #2, #3, ..., #n are applied from the weight vector control unit 11 to other inputs of these multipliers 12-1, 12-2, 12-3, ..., 12-n respectively. The weight vector control unit 11 calculates these weights w1, w2, w3, ..., wn in real time, as described later.

Therefore, the signal x1(t) received in the antenna #1 is converted to w1×(a1A(t)+b1B(t)) through the multiplier 12-1, the signal x2(t) received in the antenna #2 is converted to w2×(a2A(t)+b2B(t)) through the multiplier 12-2, the signal x3(t) received in the antenna #3 is converted to w3×(a3A(t)+b3B(t)) through the multiplier 12-3, and the signal xn(t) received in the antenna #n is converted to wn×(anA(t)+bnB(t)) through the multiplier 12-n.

An adder 13 adds the outputs of these multipliers 12-1, 12-2, 12-3, ..., 12-n, and outputs the following signal:

w1(a1A(t)+b1B(t))+w2(a2A(t)+b2B(t))+3(a3A(t)+b3B(t))+ ... +wn(anA(t)+bnB(t))

This expression is classified into terms related to the signals A(t) and B(t) respectively as follows:

(w1a1+w2a2+w3a3+ ... + wnan)A(t)+(w1b1+w2b2+w3b3+ ... +wnbn)B(t)

As described later, the adaptive array radio base station 1 identifies the users A and B and calculates the aforementioned weights w1, w2, w3, ..., wn to be capable of extracting only the signal from the desired user. Referring to FIG. 17, for example, the weight vector control unit 11 regards the factors a1, a2, a3, ..., an and b1, b2, b3, ..., bn as constants and calculates the weights w1, w2, w3, ..., wn so that the factors of the signals A(t) and B(t) are 1 and 0 as a whole respectively, in order to extract only the signal A(t) from the intended user A for communication.

In other words, the weight vector control unit 11 solves the following simultaneous linear equations, thereby calculating the weights w1, w2, w3, ..., wn on real time basis so that the factors of the signals A(t) and B(t) are 1 and 0 respectively:

$$w1a1+w2a2+w3a3+ \ldots +wnan=1$$

$$w1b1+w2b2+w3b3+ \ldots +wnbn=0$$

The method of solving the above simultaneous linear equations, not described in this specification, is known as described in the aforementioned literature and already put into practice in an actual adaptive array radio base station.

When setting the weights w1, w2, w3, ..., wn in the aforementioned manner, the adder 13 outputs the following signal:

$$\text{output signal}=1\times A(t)+0\times B(t)=A(t)$$

[User Identification, Training Signal]

The aforementioned users A and B are identified as follows:

FIG. 18 is a schematic diagram showing the frame structure of a radio signal for a portable telephone set. The radio signal for the portable telephone set is roughly formed by a preamble consisting of a signal sequence known to the radio base station and data (sound etc.) consisting of a signal sequence unknown to the radio base station.

The signal sequence of the preamble includes a signal sequence of information for recognizing whether or not the user is a desired user for making communication with the radio base station. The weight vector control unit 11 (FIG. 17) of the adaptive array radio base station 1 compares a training signal corresponding to the user A fetched from a memory 14 with the received signal sequence and performs weight vector control (decision of weights) for extracting a signal apparently including the signal sequence corresponding to the user A. The adaptive array radio base station 1 outputs the signal from the user A extracted in the aforementioned manner as an output signal $S_{RX}(t)$.

Referring again to FIG. 17, an external input signal $S_{TX}(t)$ is input to a transmission unit 1T forming the adaptive array radio base station 1 and supplied to one inputs of multipliers 15-1, 15-2, 15-3, ..., 15-n. The weights w1, w2, w3, ..., wn previously calculated by the weight vector control unit 11 on the basis of the received signal are copied and applied to other inputs of these multipliers 15-1, 15-2, 15-3, ..., 15-n respectively.

The input signals $S_{TX}(t)$ weighted by these multipliers 15-1, 15-2, 15-3, ..., 15-n are sent to the corresponding antennas #1, #2, #3, ..., #n through corresponding switches 10-1, 10-2, 10-3, ..., 10-n respectively, and transmitted into the area 3 shown in FIG. 16.

The signal transmitted through the same array antenna 2 as that in receiving is weighted for the target user A similarly to the received signal, and hence the portable telephone set 4 of the user A receives the transmitted radio signal as if the signal has directivity to the user A. FIG. 19 images such transfer of a radio signal between the user A and the adaptive array radio base station 1. Imaged is such a state that the adaptive array radio base station 1 transmits the radio signal with directivity toward the target portable telephone set 4 of the user A as shown in a virtual area 3a in FIG. 19 in contrast with the area 3 of FIG. 16 showing the range actually receiving radio waves.

As described above, in the PDMA method, a technique is necessary to remove co-channel interference. In this point, an adaptive array that places nulls on the interfering waves adaptively is an effective means, as it can effectively suppress the interfering wave even when the level of the interfering wave is higher than the level of the desired wave.

When an adaptive array is used for a base station, it becomes possible not only to remove interference at the time of reception but also to reduce unnecessary radiation at the time of transmission.

At this time, an array pattern at the time of transmission may be an array pattern for reception, or the array pattern may be newly generated based on a result of incoming direction estimation, for example. The latter method is applicable no matter whether FDD (Frequency Division Duplex) or TDD (Time Division Duplex) is used. It requires, however, a complicated process. When the former approach is to be used while FDD is utilized, modification of the array arrangement or weight becomes necessary, as the array patterns for transmission and reception are different. Therefore, generally, application is on the premise that TDD is utilized, and in an environment where external slots are continuous, satisfactory characteristic has been ensured.

As described above, in the TDD/PDMA method using an adaptive array in the base station, when an array pattern (weight vector pattern) obtained for the up link is used for the down link, transmission directivity may possibly be degraded in the down link because of time difference between the up and down links, assuming a dynamic Rayleigh propagation degree with angular spread.

More specifically, there is a time interval from transmission of the radiowave from a user terminal to the base station through the up link until radiowave is emitted from the base station to the user terminal through the down link. Therefore, if the speed of movement of the user terminal is not negligible, transmission directivity degrades because of the difference between the direction of radiowave emission from the base station and the actual direction of the user terminal.

As a method of estimating weight for the down link considering such a variation in the propagation path, a method of estimating a transmission response vector of the down link by extrapolation utilizing a reception response vector obtained in the up link has been proposed.

When there is an estimation error in the reception response vector estimated for the up link because of a noise in the reception signal or sampling error, there would be an error in the result of extrapolation, making it difficult to correctly estimate the transmission response vector for the down link, and hence, it becomes impossible to realize satisfactory control of transmission directivity.

Now, propagation environment of the propagation path is represented by variation of reception coefficient of the propagation path, that is, degree of fading. The degree of fading is represented by a so-called Doppler frequency (FD) as a physical amount.

More specifically, dependent on the degree of fading on the propagation path, there would be an error in the result of extrapolation. Therefore, in order to prevent extrapolation error, it is necessary to know the degree of fading of the propagation path, that is, to know the Doppler frequency.

A method has been proposed as disclosed, for example, in Japanese Patent Laying-Open No. 7-162360, in which the degree of fading is estimated by finding a correlation value of reference signals included in reception signals received preceding and succeeding in time with respect to each other. In the conventional method, however, the correlation value is calculated using reference signals that are included in the reception signals themselves, which means that there are much interfering components, making correct estimation difficult.

Further, the timing of the reference signals is fixed. Therefore, it was impossible to calculate the correlation value at an arbitrarily timing, and therefore, the calculating process was not flexible.

Meanwhile, the method of estimating Doppler frequency of the propagation path for each user terminal separated by the adaptive array processing has not yet been developed.

SUMMARY OF THE INVENTION

An object of the present invention is to provide a radio equipment capable of correctly estimating a transmission response vector of the down link even when there is an estimation error in the reception response vector estimated for the up link, and hence capable of satisfactory control of transmission directivity.

Another object of the present invention is to provide a Doppler frequency estimating circuit for estimating the Doppler frequency for each user terminal, which is free from the influence of the interfering component of the reception signal and has increased flexibility in an operating process.

A still further object of the present invention is to provide a radio equipment employing the Doppler frequency estimating circuit for estimating the Doppler frequency of each user terminal, which is free from the influence of the interfering component of the reception signal and has increased flexibility in an operating process.

According to an aspect, the present invention provides a radio equipment transmitting/receiving signals time-divisionally to/from a plurality of terminals while changing antenna directivity on real time basis, including a plurality of antennas arranged in a discrete manner, and a transmission circuit and a reception circuit that share the plurality of antennas for transmitting/receiving signals. The reception circuit includes a reception signal separating unit separating a signal from a specific terminal among the plurality of terminals, based on signals from the plurality of antennas when the reception signal is received, and a reception propagation path estimating unit estimating a reception response vector of a propagation path from the specific terminal, based on the signals from the plurality of antennas when the reception signal is received. The transmission circuit includes a transmission propagation path estimating unit estimating a transmission response vector of a transmission path when a transmission signal is transmitted, based on the result of estimation by the reception propagation path estimating unit, and a transmission directivity control unit updating the antenna directivity when the transmission signal is transmitted, based on a result of estimation by the transmission propagation path estimating unit. The transmission propagation path estimating unit has an extrapolation processing unit calculating the transmission response vector of a down link slot to the specific terminal, by an extrapolation process based on a plurality of reception response vectors of up link slots from the specific terminal estimated by the reception propagation path estimating unit, a memory holding a plurality of parameters used for the extrapolation process, determined in advance in accordance with the propagation environment of the propagation path, and a selecting unit estimating the propagation environment of the propagation path, selecting a parameter corresponding to the estimated propagation environment among the held plurality of parameters, and applying the selected parameter to the extrapolation process by the extrapolation processing unit.

Therefore, even when there is an estimation error in the reception response vector estimated for the up link, the transmission response vector for the down link can be estimated correctly and hence satisfactory control of transmission directivity can be realized, as the parameter used for the extrapolation process is selected in accordance with the propagation environment of the propagation path.

Preferably, the parameter is an extrapolation distance in the extrapolation process by the extrapolation processing unit. The memory holds a plurality of extrapolation distances determined in advance in accordance with the Doppler frequencies representing the propagation environment. The selecting unit estimates the Doppler frequency of the propagation path, selects the extrapolation distance corresponding to the estimated Doppler frequency among the held plurality of extrapolation distances and applies the selected extrapolation distance to the extrapolation process by the extrapolation processing unit.

Therefore, when there is an estimation error in the reception response vector of the up link, there would be a larger extrapolation error as the extrapolation distance for the extrapolation process becomes longer, and in view of this phenomenon, it becomes possible to estimate the transmission response vector correctly by selecting the extrapolation distance in accordance with the Doppler frequency representing the propagation environment.

More preferably, the selecting unit selects a shorter extrapolation distance when the estimated Doppler frequency is lower, and selects a longer extrapolation distance when it is higher.

Therefore, as the variation in the propagation environment is smaller as the Doppler frequency is lower, extrapolation exceeding the actual amount of variation is prevented by making shorter the extrapolation distance, and as the variation in propagation environment is larger as the Doppler frequency is higher, sufficient extrapolation is ensured by making longer the extrapolation distance.

More preferably, the parameter is an extrapolation distance in an extrapolation process by the extrapolation processing unit. The memory holds a plurality of extrapolation distances determined in advance in accordance with a signal error between the separated signals and an expected desired signals representing the propagation environment. The selecting unit estimates signal error of the propagation path, selects the extrapolation distance corresponding to the estimated signal error among the held plurality of extrapolation distances, and applies the selected extrapolation distance to the extrapolation process by the extrapolation processing unit.

When there is a large signal error, the estimation error of the reception response vector of the up link becomes larger and the extrapolation error also becomes larger, and in view of this phenomenon, an extrapolation distance in accordance with the signal error representing the propagation environment is selected, whereby it becomes possible to correctly estimate the transmission response vector.

More preferably, the selecting unit selects a shorter extrapolation distance when the estimated signal error is larger, and selects a larger extrapolation distance when it is smaller.

When the signal error is larger, the extrapolation error increases, and therefore, extrapolation error is suppressed by making shorter the extrapolation distance, and when the signal error becomes smaller, the extrapolation error becomes smaller, and therefore, sufficient extrapolation can be done by making longer the extrapolation distance.

More preferably, the parameter is an extrapolation distance in an extrapolation process by the extrapolation processing unit. The memory holds a plurality of extrapolation distances determined in advance in accordance with Doppler frequencies and a signal error between the separated signal and an expected desired signal, which represent the propagation environment. The selecting unit estimates the Doppler frequency and the signal error of the propagation path, selects an extrapolation distance corresponding to the estimated Doppler frequency and the signal error among the held plurality of extrapolation distances, and applies the selected one to the extrapolation process by the extrapolation processing unit.

Therefore, in view of the fact that the Doppler frequency and the signal error increase extrapolation error, an extrapolation distance in accordance with the Doppler frequency and the signal error representing the propagation environment is selected, whereby correct estimation of transmission response vector becomes possible.

More preferably, the selecting unit temporarily selects an extrapolation distance corresponding to the estimated Doppler frequency, and corrects the temporarily selected extrapolation distance in accordance with the estimated signal error.

Therefore, basic extrapolation distance is selected in accordance with the Doppler frequency that has much influence on the extrapolation error, and the extrapolation distance is corrected based on the signal error, whereby more accurate estimation of transmission response vector becomes possible.

More preferably, the relation between the propagation environment and the plurality of parameters is determined individually for every radio equipment.

Therefore, as the correspondence between the propagation environment and the parameters is found by measurement in advance for each radio equipment, more accurate estimation of transmission response vector becomes possible.

More preferably, the relation between the propagation environment and the plurality of parameters is determined commonly to a plurality of the radio equipments.

Therefore, when there is only a small difference between the individual radio equipments, the correspondence between the propagation environment and the parameters is made common among a plurality of radio equipments, whereby the process steps for manufacturing the radio equipments can be simplified.

According to another aspect, the present invention provides, in a radio equipment that changes antenna directivity on real time basis and transmits/receives signals time divisionally to/from a plurality of terminals, a Doppler frequency estimating circuit estimating Doppler frequency of a propagation path with a specific terminal, which includes: a reception signal separating unit separating a signal from the specific terminal among the plurality of terminals, based on signals received by a plurality of antennas arranged in a discrete manner; a reception propagation path estimating unit estimating a reception response vector of a propagation path from the specific terminal based on signals received by the plurality of antennas; a correlation operating unit calculating a vector correlation value based on reception response vectors preceding and succeeding in time estimated by the reception propagation path estimating unit; and an estimating unit estimating a Doppler frequency corresponding to the vector correlation value calculated by the correlation operating unit, based on a correspondence between vector correlation values and Doppler frequencies determined in advance experimentally.

Therefore, not the reception signal itself but a correlation value of reception response vectors is calculated, and therefore, Doppler frequency of the propagation path for each separated specific terminal can be correctly estimated, free from the influence of the interfering component.

Preferably, the correlation operating unit includes a calculating unit calculating an instantaneous correlation value between the reception response vectors preceding and succeeding in time, and outputting calculated value as the vector correlation value.

Therefore, it is possible to find correlation between reception response vectors at an arbitrary timing, and hence instantaneous Doppler frequency of the propagation path can be correctly estimated.

Preferably, the correlation operating unit includes a calculating unit calculating an instantaneous correlation value between the reception response vectors preceding and succeeding in time, and an averaging unit weight-averaging a past correlation value and a present correlation value calculated by the calculating unit, with a prescribed weight coefficient, and outputting an obtained average value as said vector correlation value.

Therefore, even when there is generated an error in the instantaneous Doppler frequency because of an abrupt fading, the Doppler frequency can be estimated correctly without the influence of such error, as the correlation values are averaged.

More preferably, the prescribed weight coefficient is set such that a weight for a past correlation value is large and a weight for a present correlation value is small.

As the weight of the past correlation value is made large at the time of averaging, even when there is generated an error in the instantaneous Doppler frequency because of an abrupt fading, more accurate estimation of the Doppler frequency is possible, not influenced by the error.

More preferably, the correlation operating unit calculates a vector correlation value, based on a reception response vector of a present frame slot and a reception response vector of an immediately preceding frame slot.

Therefore, different from the reference signal in the prior art, mutual correlation between reception response vectors can be obtained at any timing, and therefore, flexibility of operation to calculate the correlation value is increased.

More preferably, the correlation operating unit calculates a vector correlation value based on a reception response vector of a present frame slot and a reception response vector of a most recent slot free of any reception error among past frame slots.

Therefore, different from the reference signal in the prior art, mutual correlation between reception response vectors can be obtained at any timing, and therefore, flexibility of operation to calculate the correlation value can be increased and, particularly, the influence of reception error can be eliminated.

More preferably, the correlation operating unit calculates a vector correlation value based on a reception response vector of a former half and a reception response vector of a latter half of one slot.

Therefore, different from the reference signal in the prior art, mutual correlation of the reception response vectors can be obtained at any timing, and therefore, flexibility of operation to calculate the correlation value can be increased.

According to a still further aspect, the present invention provides a radio equipment that changes antenna directivity on a real time basis and transmits/receives signals time divisionally to/from a plurality of terminals, including a plurality of antennas arranged in a discrete manner, and a transmission circuit and a reception circuit sharing the plurality of antennas for transmitting/receiving signals. The reception circuit includes a reception signal separating unit separating a signal from a specific terminal among the plurality of terminals based on signals from the plurality of antennas, when a reception signal is received, and a reception propagation path estimating unit estimating a reception response vector of a propagation path from the specific terminal based on signals from the plurality of antennas, when reception of the reception signal is received. The transmission circuit includes a transmission propagation path estimating unit estimating a transmission response vector of a propagation path when a transmission signal is transmitted based on a result of estimation by the reception propagation path estimating unit, and a transmission directivity control unit updating the antenna directivity when the transmission signal is transmitted, based on a result of estimation by the transmission propagation path estimating unit. The transmission propagation path estimating unit includes: an extrapolation processing unit calculating the transmission response vector of a down link slot to the specific terminal, by an extrapolation process based on a plurality of reception response vectors of up link slots of the specific terminal estimated by the reception propagation path estimating unit; a Doppler frequency estimating unit estimating a Doppler frequency of the propagation path, a memory holding a plurality of parameters used for the extrapolation process determined in advance in accordance with the Doppler frequencies of the propagation path; and a selecting unit selecting a parameter corresponding to the estimated Doppler frequency among the held plurality of parameters and applying the selected parameter to the extrapolation process by the extrapolation processing unit. The Doppler frequency estimating unit includes: a correlation operating unit calculating a vector correlation value based on reception response vectors preceding and succeeding in time estimated by the reception propagation path estimating unit; and an estimating unit estimating the Doppler frequency corresponding to the vector correlation value calculated by the correlation operating unit, based on the correspondence between vector correlation values and Doppler frequencies determined in advance experimentally.

Therefore, not the reception signal itself but the correlation value of reception response vectors is found, and therefore, Doppler frequency of the propagation path for each separated specific terminal can be estimated correctly without the influence of the interfering component. Therefore, even when there is an estimation error in the reception response vector estimated for the up link, the transmission response vector of the down link can be estimated correctly, and hence, satisfactory control of transmission directivity can be realized.

Preferably, the correlation operating unit includes a calculating unit calculating an instantaneous correlation value between reception response vectors preceding and succeeding in time and outputting the calculated value as the vector correlation value.

Therefore, correlation between reception response vectors can be obtained at an arbitrary timing, and hence instantaneous Doppler frequency of the propagation path can be estimated correctly. Hence, more accurate estimation of transmission response vector becomes possible.

More preferably, the correlation operating unit includes a calculating unit calculating an instantaneous correlation value between the reception response vectors preceding and succeeding in time, and an averaging unit weight-averaging a past correlation value and a present correlation value calculated by the calculating unit with a prescribed weight coefficient, and outputting an obtained average value as said vector correlation value.

Therefore, even when there is generated an error in the instantaneous Doppler frequency because of an abrupt fading, the Doppler frequency can be estimated correctly without the influence of such error, as the correlation values are averaged, and hence more accurate estimation of transmission response vector becomes possible.

More preferably, the prescribed weight coefficient is set such that a weight for a past correlation value is large and a weight for a present correlation value is small.

As the weight of the past correlation value is made large at the time of averaging, even when there is generated an error in the instantaneous Doppler frequency because of an abrupt fading, more accurate estimation of the Doppler frequency is possible, not influenced by the error, and hence more accurate estimation of transmission response vector becomes possible.

More preferably, the correlation operating unit calculates a vector correlation value, based on a reception response vector of a present frame slot and a reception response vector of an immediately preceding frame slot.

Therefore, different from the reference signal in the prior art, mutual correlation between reception response vectors can be obtained at any timing, and therefore, flexibility of operation to calculate the correlation value is increased.

More preferably, the correlation operating unit calculates a vector correlation value based on a reception response vector of a present frame slot and a reception response vector of a most recent slot free of any reception error among past frame slots.

Therefore, different from the reference signal in the prior art, mutual correlation between reception response vectors can be obtained at any timing, and therefore, flexibility of operation to calculate the correlation value can be increased and, particularly, the influence of reception error can be eliminated.

More preferably, the correlation operating unit calculates the vector correlation value based on a reception response vector of a former half and a reception response vector of a latter half of one same slot.

Therefore, different from the reference signal in the prior art, mutual correlation of the reception response vectors can be obtained at any timing, and therefore, flexibility of operation to calculate the correlation value can be increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a flow chart illustrating an outline of the operation of the radio equipment (radio base station) 1000.

FIG. 3 is a schematic diagram representing a basic operation of a transmission response vector estimator 32.

FIG. 5 is an illustration representing the principle of determining extrapolation distance in accordance with an embodiment of the present invention.

FIG. 8 is a flow chart representing an example of a Doppler frequency estimating operation in accordance with an embodiment of the present invention.

FIG. 13 is a flow chart representing an outline of the extrapolation process in accordance with a still further embodiment of the present invention.

DESCRIPTION OF THE PREFERRED EMBODIMENTS

Figure 1:
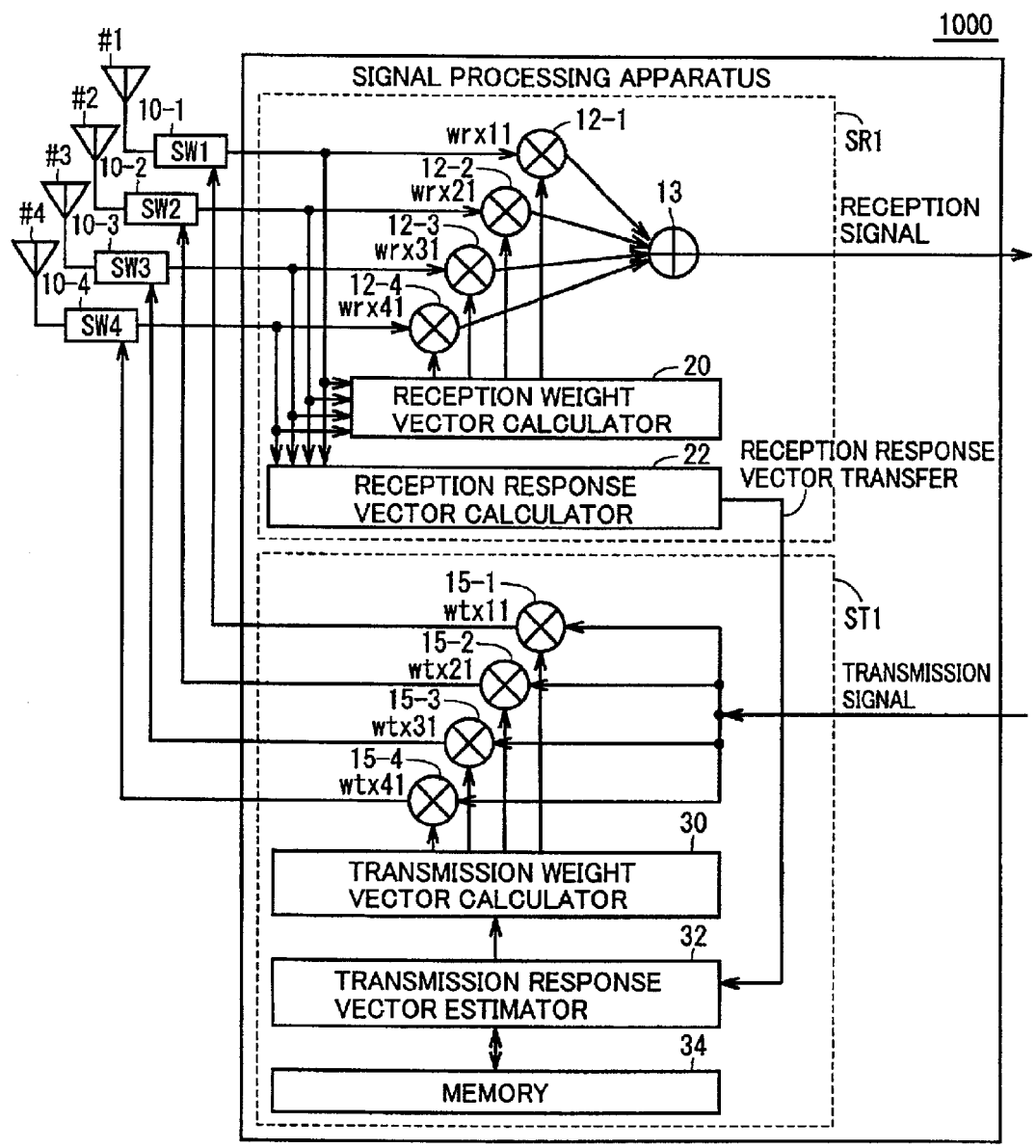
FIG. 1 is a schematic block diagram showing a configuration of a radio equipment (radio base station) 1000 of a PDMA base station to which the present invention is applied.

FIG. 1 is a schematic block diagram representing a radio equipment (radio base station) 1000 of a PDMA base station in accordance with an embodiment of the present invention.

In the configuration shown in FIG. 1, in order to distinguish a user PS1 from a user PS2, four antennas #1 to #4 are provided. The number of antennas, however, may be generally represented as N (N: natural number).

In the transmission/reception system 1000 shown in FIG. 1, a reception unit SR1 receiving signals from antennas #1 to #4 and separating a signal from a corresponding user (for example, user PS1), and a transmitting unit ST1 for transmitting a signal to user PS1 are provided. Connection between antennas #1 to #4 and reception unit SR1 or transmission unit ST1 is selectively switched by switches 10-1 to 10-4.

More specifically, reception signals RX1(t), RX2(t), RX3(t) and RX4(t) received by respective antennas are input to reception unit SR1 through corresponding switches 10-1, 10-2, 10-3 and 10-4, applied to a reception weight vector calculator 20 and a reception response vector calculator 22, as well as to one inputs of multipliers 12-1, 12-2, 12-3 and 12-4, respectively.

To the other inputs of these multipliers, weight coefficients wrx11, wrx21, wrx31 and wrx41 for the reception signals of respective antennas are applied from reception weight vector calculator 20. The weight coefficients are calculated on real time basis by reception weight vector calculator 20, as in the prior art.

Transmission unit ST1 includes: a transmission response vector estimator 32 receiving a reception response vector calculated by reception response vector calculator 22 and finding a transmission response vector by estimating a propagation path at the time of transmission, that is, estimating a virtual reception response vector at the time of transmission; a memory 34 communicating data with the transmission response vector estimator 32 and storing and holding data; a transmission weight vector calculator 30 calculating a transmission weight vector based on the result of estimation by transmission response vector estimator 32; and multipliers 15-1, 15-2, 15-3 and 15-4 receiving at one inputs a transmission signal and at the other inputs, weight coefficients wtx11, wtx21, wtx31 and wtx41 from transmission weight vector calculator 30, respectively. Outputs from multipliers 15-1, 15-2, 15-3, and 15-4 are applied through switches 10-1 to 10-4 to antennas #1 to #4.

Though not shown in FIG. 1, a configuration similar to that of reception unit SR1 and transmission unit ST1 is provided for each user.

[Principal of Operation of Adaptive Array]

The operation of reception unit SR1 will be briefly described in the following.

The reception signals RX1(t), RX2(t), RX3(t) and RX4(t) received by the antennas are represented by the following equations.

$$RX_1(t) = h_{11} Srx_1(t) + h_{12} Srx_2(t) + n_1(t) \quad (1)$$

$$RX_2(t) = h_{21} Srx_1(t) + h_{22} Srx_2(t) + n_2(t) \quad (2)$$

$$RX_3(t) = h_{31} Srx_1(t) + h_{32} Srx_2(t) + n_3(t) \quad (3)$$

$$RX_4(t) = h_{41} Srx_1(t) + h_{42} Srx_2(t) + n_4(t) \quad (4)$$

Here, the signal RXj(t) represents a reception signal of the j-th (j=1, 2, 3, 4) antenna, while the signal Srxi(t) represents a signal transmitted from the i-th (i=1, 2) user.

Further, the coefficient hji represents a complex coefficient of the signal from the i-th user and received by the j-th antenna, while nj(t) represents noise included in the j-th reception signal.

The equations (1) to (4) above in vector representation are as follows.

$$X(t) = H_1 Srx_1(t) + H_2 Srx_2(t) + N(t) \quad (5)$$

$$X(t) = [RX_1(t), RX_2(t), \ldots, RX_4(t)]^T \quad (6)$$

$$H_i = [h_{1i}, h_{2i}, \ldots, h_{4i}]^T, (i=1, 2) \quad (7)$$

$$N(t) = [n_1(t), n_2(t), \ldots, n_4(t)]^T \quad (8)$$

In equations (6) to (8), [. . .] T represents transposition of [. . .].

Here, X(t) represents an input signal vector, Hi represents a reception response vector of the i-th user, and N(t) represents a noise vector, respectively.

The adaptive array antenna outputs a signal synthesized by multiplying the input signals from respective antennas by weight coefficients wrx1i to wrx4i, as a reception signal SRX(t) as shown in FIG. 1.

Now, on the premise of the above described preparation, the operation of an adaptive array extracting the signal Srx1(t) transmitted from the first user is as follows.

The output signal y1(t) of adaptive array 100 can be represented by the following equations, by a multiplication of input signal vector X(t) and the weight vector W1.

$$y_1(t) = X(t) W_1^T \quad (9)$$

$$W_1 = [wrx_{11}, wrx_{21}, wrx_{31}, wrx_{41}]^T \quad (10)$$

More specifically, the weight vector W1 is a vector that has, as components, weight coefficients wrxj1 (j=1, 2, 3, 4) to be multiplied by the j-th input signal RXj(t).

Now, when we substitute input signal vector X(t) represented by the equation (5) for y1(t) represented by the equation (9), the following equation results.

$$y1(t) = H_1 W_1^T Srx_1(t) + H_2 W_1^T Srx_2(t) + N(t) W_1^T \quad (11)$$

When adaptive array 100 operates ideally here, weight vector W1 is sequentially controlled by weight vector control unit 11 to satisfy the following simultaneous equation, by a known method.

$$H_1 W_1^T = 1 \quad (12)$$

$$H_2 W_1^T = 0 \quad (13)$$

When weight vector W1 is fully controlled to satisfy equations (12) and (13), the output signal y1(t) from adaptive array 100 is eventually given by the following equations.

$$y1(t) = Srx_1(t) + N_1(t) \quad (14)$$

$$N_1(t) n_1(t) w_{11} + n_2(t) w_{21} + n_3(t) w_{31} + n_4(t) w_{41} \quad (15)$$

Namely, as the output signal y1(t), the signal Srx1(t) transmitted by the first of the two users is obtained.

[Summary of Operation of Radio Equipment 1000]

FIG. 2 is a flow chart representing an outline of a basic operation of radio equipment 1000 as the base of the present invention.

In radio equipment 1000, noting that the weight vector (weight coefficient vector) of the adaptive array can be represented uniquely by the reception response vector of each antenna element, the weight is indirectly estimated, by estimating time variation of the reception response vector.

First, at reception unit SR1, propagation path of the reception signal is estimated, based on the reception signal (step S100). Estimation of the propagation path corresponds to finding an impulse response of the signal transmitted from the user, in accordance with equations (1) to (4).

In other words, if the reception response vector H1 can be estimated in equations (1) to (4), for example, the transmission path at the time of signal reception from user PS1 can be estimated.

Thereafter, transmission response vector estimator 32 predicts propagation path at the time of transmission, that is, predicts reception response vector at the time of transmission, from the reception response vector at the time of reception (step S102). The predicted reception response vector corresponds to the transmission response vector at the time of transmission.

Further, transmission weight vector calculator 30 calculates the transmission weight vector based on the predicted transmission response vector, and outputs the result to multipliers 15-1 to 15-4 (step S104).

[Operation of Reception Response Vector Calculator 22]

A basic operation as a base of the present invention of reception response vector calculator 22 shown in FIG. 1 will be described.

First, assume that there are four antenna elements and two users communicate simultaneously. The signals output from reception circuit through respective antennas are represented by the equations (1) to (4) above.

At this time, the reception signals of the antennas represented by the equations (1) to (4) in vector representations are, again, given as equations (5) to (8).

$$X(t)=H_1 Srx_1(t)+H_2 Srx_2(t)+N(t) \quad (5)$$

$$X(t)=[RX_1(t), RX_2(t), \ldots, RX_n(t)]^T \quad (6)$$

$$H_i=[h_{1i}, h_{2i}, \ldots, h_{ni}]^T, (i=1, 2) \quad (7)$$

$$N(t)=[n_1(t), n_2(t), \ldots, n_n(t)]^T \quad (8)$$

When the adaptive array is operating satisfactorily, signals from respective users are separated and extracted, and therefore, the signals Srxi(t) (i=1, 2) all have the known values.

At this time, utilizing the fact that the signal Srxi(t) is a known signal, it is possible to extract reception response vectors H1=[h11, h21, h31, h41] and H2=[h12, h22, h32, h42] in the following manner.

More specifically, by multiplying the reception signal by the known user signal, for example, the signal Srx1(t) from the first user, an ensemble average (time average) can be calculated in the following manner.

$$E[X(t)\cdot Srx_1^*(t)]=H_1\cdot E[Srx_1(t)\cdot Srx_1^*(t)]+H2\cdot E[Srx_2(t)\cdot Srx_1^*(t)+E[N(t)\cdot Srx_1^*(t)] \quad (16)$$

In equation (16), E[...] represents the time average, and S*(t) represents a conjugate complex of S(t). When the time for averaging is sufficiently long, the average value can be given by the following.

$$E[Srx1(t)\cdot Srx^*(t)]=1 \quad (17)$$

$$E[Srx2(t)\cdot Srx1^*(t)]=0 \quad (18)$$

$$E[N(t)\cdot Srx1^*(t)]=0 \quad (19)$$

Here, the value of equation (18) becomes 0, as there is no correlation between the signal Srx1(t) and the signal Srx2(t). The value of the equation (19) becomes 0, as there is no correlation between the signal Srx1(t) and the noise signal N(t).

Therefore, the ensemble average of equation (16) is, as a result, equal to the reception response vector H1, as shown below.

$$E[X(t)\cdot Srx_1^*(t)]=H_1 \quad (20)$$

By the above described procedure, the reception response vector H1 of the signal transmitted from the first user PS1 can be estimated.

In the similar manner, by an ensemble averaging operation of input signal vector X(t) and the signal Srx2(t), it is possible to estimate the reception response vector H2 of the signal transmitted from the second user PS2.

The above described ensemble averaging is performed for a train of a prescribed number of data symbol at the head and a train of a prescribed number of data symbol at the end within one time slot at the time of reception.

[Estimation of Transmission Response Vector]

FIG. 3 is a schematic diagram representing a basic operation of the transmission response vector estimator 32 as a base of the present invention. Consider a 8-slot configuration in which 4 users are allocated for up and down links as PDMA burst. As to the slot configuration, the head 31 symbols constitute the first training symbol train, succeeding 68 symbols constitute data symbol train and the last 31 symbols constitute the second training symbol train, for example.

As described above, training symbol trains are provided at the head and at the end of the up link slot, and both reception response vectors are calculated using the algorithm of the reception response vector calculator 22 described above.

By extrapolation process (linear extrapolation), the reception response vector for the down link is estimated.

More specifically, assuming that a value at an arbitrary time point t of an element of the reception response vector is f(t), based on the value f(t0) at a time point t0 of the head training symbol train of the up link slot and on the value f(t1) at a time point t1 of the last training symbol train of the up link slot, the value f(t) at a time point t of the down link slot can be predicted in the following manner.

$$f(t)=[f(t1)-f(t0)]/(t1-t0)\times(t-t0)+f(t0)$$

More specifically, the training symbol trains are provided at the head and at the end of the up link slot and linear extrapolation is performed in the above described example. A training symbol train may be additionally provided at a central portion of the up link slot, and the value f(t) at the time point t may be estimated by secondary extrapolation, from values of three points within the up link slot of the reception response vector. Alternatively, higher order of extrapolation becomes possible by increasing the number of positions at which training symbol trains are provided within the up link slot.

The present invention relates to an improvement of the method of estimating a reception (transmission) response vector for the down link by such an extrapolation process as well as to a Doppler frequency estimation circuit necessary for the improvement, details of which will be described later. First, determination of the transmission weight vector will be described.

[Determination of Transmission Weight Vector]

When the estimation value of the reception response vector at the time of transmission is calculated in the above described manner, the transmission weight vector can be found by any of the following three methods.

i) Method Utilizing Orthogonalization

Consider a weight vector W (1) (i)=[wtx11, wtx12, wtx13, wtx14] at a time point t=iT (i: natural number, T: unit time interval) of a user PS1. In order to place nulls to user PS2, the following conditions should be satisfied.

Assume that a predicted propagation path (reception response vector) for the user PS2 is V(2) (i)=[h1' (2) (i), h2' (2) (i), h3' (2) (i), h4' (2) (i)]. Here, hp' (q) (i) represents a predicted value at a time point i of the reception response vector for the p-th antenna of the q-th user. It is assumed that the propagation path V(1) (i) for the user PS1 has already been predicted in the similar manner.

Here, W(1) (i) is determined to satisfy that W(1) (i) TV(2) (i)=0. The following conditions c1) and c2) are imposed as binding conditions.

c1) W(1) (i) TV(1) (i)=g (constant value)

c2) ‖W(1) (i)‖ is a minimum value

The condition c2) corresponds to minimization of the transmission power.

ii) Method Utilizing Spurious Correlation Matrix

Here, the adaptive array includes a number of antenna elements and a portion controlling the weight values of respective elements, as already described. Generally, when we represent the input vector of an antenna as X(t) and weight vector as W, optimal weight W opt can be given by the following equation (Wiener solution) when the weight vector is controlled to minimize means square deviation between the output Y(t)=WTX(t) and the reference signal d(t) (MMSE standard: least square method standard).

$$W_{opt} = R_{xx}^{-1} r_{xd} \quad (21)$$

Here, the following relations must be satisfied.

$$R_{xx}=E[X^*(t)xT(t)] \quad (22)$$

$$r_{xd}=E[x^*(t)d(t)] \quad (23)$$

Here, YT represents transposition of Y, Y* represents complex area of Y, and E[Y] represents an ensemble average. By this weight value, the adaptive array comes to generate an array pattern to suppress unnecessary interfering wave.

In the method utilizing the spurious correlation matrix, the equation (21) above is calculated in accordance with the spurious correlation matrix which will be described below.

More specifically, the weight vector W(k) (i) for the user k is calculated, using the estimated complex reception signal coefficient h' (k)n (i). Assuming that the array response vector of the k-th user is V(k) (i), it can be given by the following equation, as already described.

$$V^{(k)}(i) = [h_1'^{(k)}(i), h_2'^{(k)}(i) \ldots , h_N'^{(k)}(i)] \quad (24)$$

At this time, the autocorrelation matrix Rxx (i) of the virtual reception signal at t=iT can be given by the following equation, using V(k) (i).

$$R_{xx}(i) = \sum_{k=1}^{K} V^{(k)*}(i) V^{(k)T}(i) + NI \quad (25)$$

Here, N is a virtual noise term, added as Rxx (i) should be an integer. In the calculation for the present invention, N is $N=1.0\times10^{-5}$, as an example.

The correlation vector rxd (i) between the reception signal and the reference signal is given by the following equation.

$$r_{xd}(i)=V^{(k)*}(i) \quad (26)$$

Thus, the down link weight at time t=iT can b calculated by the equations (21), (25) and (26).

The inverse matrix operation of the equation (25) can be optimally calculated for the user k in accordance with the lemma of inverse matrix. Especially when there are two users, the weight can be calculated in accordance with the following simple equations.

$$W^{(1)}(i)=(p_{22}+N)V^{(1)*}(i)-p_{12}V^{(2)*}(i) \quad (27)$$

$$W^{(2)}(i) = (p_{11} + N)V^{(2)*}(i) - P_{21}V^{(1)*}(i) \quad (28)$$

$$p_{ij} = V^{(i)H}(i)V^{(j)}(i)$$

The method of calculating a weight vector when autocorrelation matrix is given in this manner is described, for example, in T. Ohgane, Y. Ogawa, and K. Itoh, Proc. VTC '97, vol. 2, pp. 725–729, May 1997 or Tanaka, Ogahne, Ogawa, Itoh, Technical Report of the Institute of Electronics, Information and Communication Engineers, vol. RCS98-117, pp. 103–108, October 1998.

iii) Method Directing a Beam to User PS1

Focusing on the point that the beam is directed to the user PS1, what is necessary is to satisfy the following equation.

$$W(1)(i)=V(1)(i)*$$

By determining the weight vector at the time of transmission by any of the above described methods for transmission, it is possible to suppress degradation of transmission directivity of the down link generated by the time difference between the up an down links even in the TDD/PDMA method, assuming a dynamic Raleigh propagation path including angular spread.

Figure 4A:
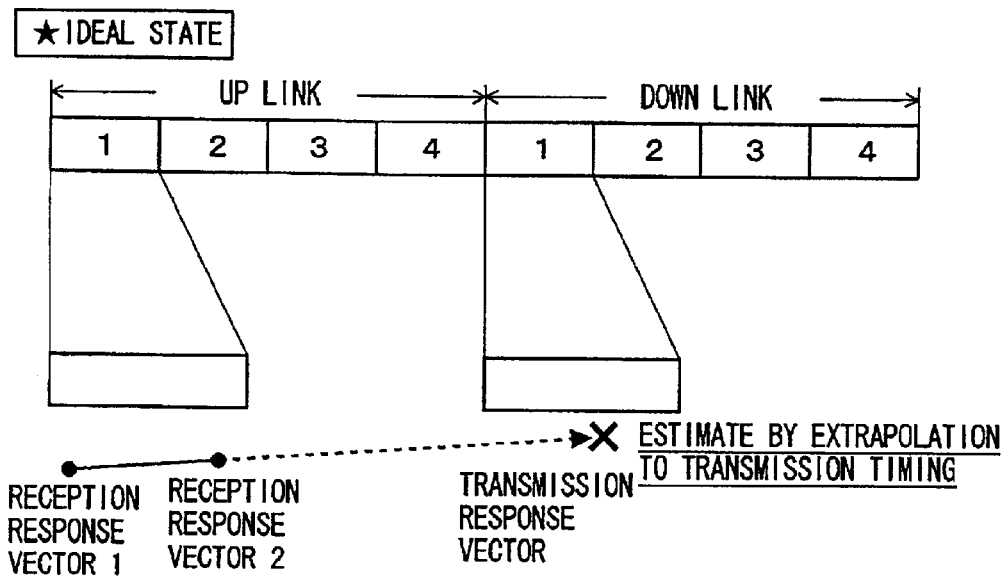
FIGS. 4A and 4B are illustrations representing a principle of estimating the transmission response vector of the present invention.
Figure 4B:
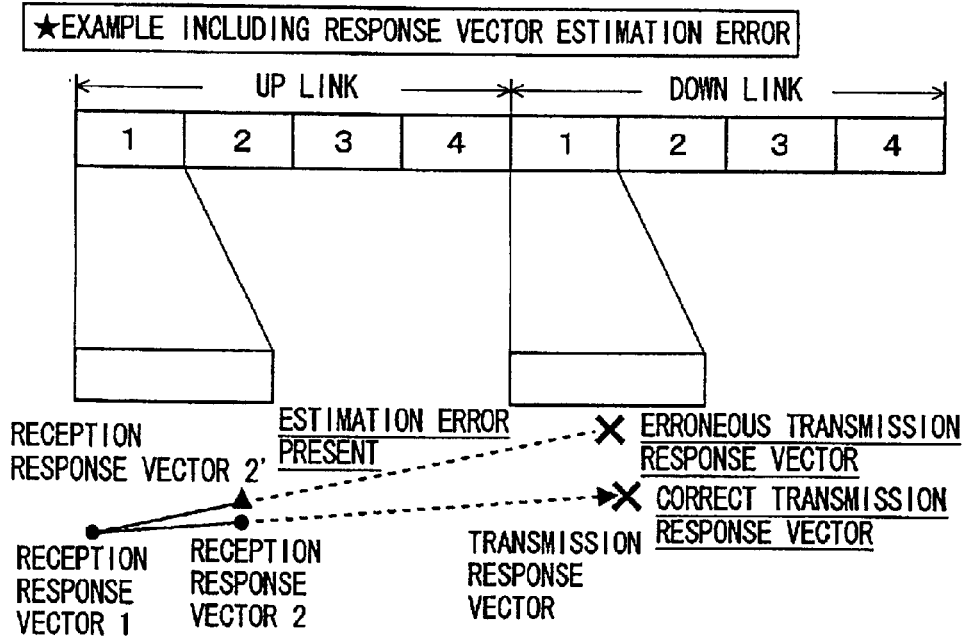

FIGS. 4A and 4B are illustrations representing the principal of estimating the transmission response vector in accordance with the present invention. The ideal state shown in FIG. 4A is, basically, a simplification of the concept shown in FIG. 3.

More specifically, based on the reception response vector 1 and reception response vector 2 that are reception response vectors at two points within the same slot of the up link calculated in step S102 of FIG. 2 by reception response vector calculator 22 shown in FIG. 1, linear extrapolation is performed to the original transmission timing of the corresponding slot of the down link, whereby a correct transmission response vector of the down link can be estimated.

Here, the "ideal state" of FIG. 4A stands on the premise that there is no estimation error in reception response vectors 1 and 2.

However, when there is an error in reception response vector 2' because of an estimation error resulting from a noise or sampling error in reception response vector 2, as shown in "example including response vector estimation error" of FIG. 4B, and linear extrapolation is performed in the similar manner (with the same extrapolation distance) as in the "ideal state", based on the reception response vectors 1 and 2', the transmission response vector at the transmission timing would be further deviated, resulting in an erroneous estimation of transmission response vector.

Therefore, when the process of determining the transmission weight (step S104 of FIG. 2) is performed by the transmission weight vector calculator 30 shown in FIG. 1 based on the erroneous transmission response vector, the resulting transmission weight would also be erroneous, causing an error in down link directivity, that is, a transmission error. Particularly, as the distance between the radio base station and the terminal is long, a slight error in directivity causes a significant transmission error.

Therefore, in the present invention, assuming that there is an estimation error in the reception response vector of the up link, an appropriate parameter, especially the extrapolation distance, for extrapolation process is adjusted in accordance with the propagation environment of the propagation path, so as to estimate a correct transmission response vector of the down link and to realize correct transmission directivity.

FIG. 5 is an illustration representing the principal of determining the extrapolation distance in accordance with an embodiment of the present invention.

The propagation environment of the propagation path is represented by the variation of reception coefficient of the propagation path, that is, the degree of fading, for example. The degree of fading is represented as a physical amount by a so-called Doppler frequency (FD).

The Doppler frequency FD in the propagation environment is estimated generally in the following manner, in accordance with the principal of estimating Doppler frequency in accordance with the present invention. Namely, a correlation value between two reception response vectors preceding and succeeding in time with respect to each other of the reception signals for each user separated by the adaptive array processing is calculated. When there is no fading, the two reception response vectors are identical, and therefore the correlation value will be 1. When there is significant fading, the difference between the reception response vectors increases, and the correlation value decreases. Such a relation between the correlation values of the reception response vectors and the Doppler frequencies FD is calculated in advance experimentally and held in a memory, whereby Doppler frequency FD at a certain time point can be estimated by calculating the correlation value of the reception response vectors. The Doppler frequency estimating circuit in accordance with the present invention will be described in greater detail later.

First, the principal of operation in accordance with an embodiment of the present invention for determining the extrapolation distance, focusing on the Doppler frequency representing the degree of fading, will be discussed.

As already described, when the reception response vector 2 is deviated as represented by the reception response vector 2' because of estimation error, the longer the extrapolation distance, the larger the extrapolation error, and therefore, the vector will be further away from the original transmission reception response vector.

Generally, the smaller the fading, namely, the lower the Doppler frequency FD, the smaller the variation of reception coefficient on the propagation path. Therefore, in such a case, the extrapolation distance is made shorter, so as to prevent extrapolation larger than the actual amount of variation. More specifically, when the Doppler frequency FD is low, a short distance extrapolation from reception response vector 2' to the point a represented by X is performed as shown in FIG. 5(A), and the transmission response vector at point a is estimated and regarded as the correct transmission response vector of the point b represented by X.

By contrast, the larger the fading, namely, the higher the Doppler frequency FD, the larger the variation of the reception coefficient of the propagation path. Therefore, in such a case, sufficient extrapolation is ensured by making longer the extrapolation distance. More specifically, when the Doppler frequency FD is high, extrapolation of a relatively long distance from the reception response vector 2' to the point c represented by X is performed as shown in FIG. 5(B), and the transmission response vector at the point c is estimated and regarded as a correct transmission response vector of the point d represented by X.

Figure 6:
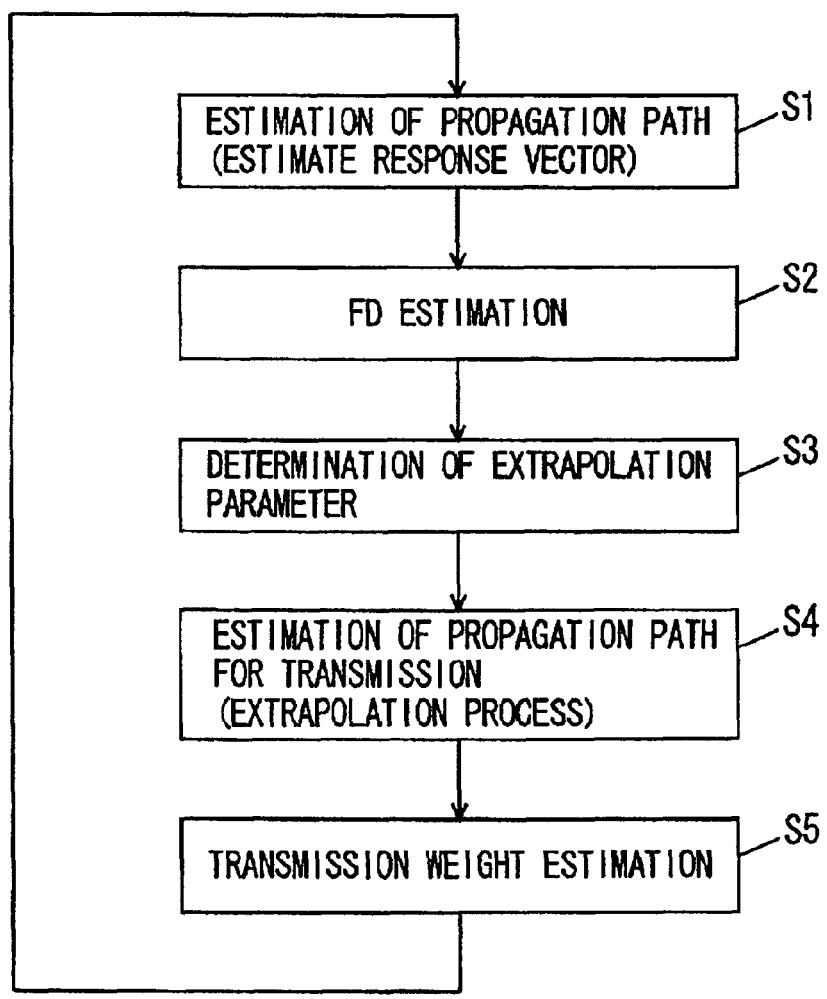
FIG. 6 is a flow chart representing an outline of the extrapolation process in accordance with an embodiment of the present invention.

Such a process is mainly executed by the transmission response vector estimator 32 shown in FIG. 1. FIG. 6 is a flow chart representing the extrapolation process, focusing on the Doppler frequency FD.

Referring to FIG. 6, in step S1, the propagation path is estimated by reception response vector calculator 22 of FIG. 1 and, specifically, reception response vectors 1 and 2' of the up link are estimated.

Next, in step S2, the degree of fading, that is, Doppler frequency FD is estimated, by the method which will be described in detail later.

Next, in step S3, by the transmission response vector estimator 32 shown in FIG. 1, the optimal extrapolation parameter, that is, extrapolation distance, in accordance with the Doppler frequency FD is determined by the method described with reference to FIG. 5. For this purpose, it is assumed that optimal extrapolation distances determined by previous measurement in accordance with high/low values of Doppler frequency FD have been held in advance in memory 34 of FIG. 1.

Thereafter, in step S4, extrapolation process is performed by using the extrapolation parameter (extrapolation distance) determined in step S3 above, and propagation path of the down link, that is, transmission response vector, is estimated.

Finally, in step S5, the transmission weight is estimated based on the transmission response vector of the down link determined in step S4 above, by the transmission weight vector calculator 30 shown in FIG. 1.

As described above, in the present embodiment, as the optimal extrapolation distance is selected dependent on whether the Doppler frequency FD is high or low, correct transmission response vector can be estimated, even when there is an estimation error in the reception response vector of the up link.

Figure 7:
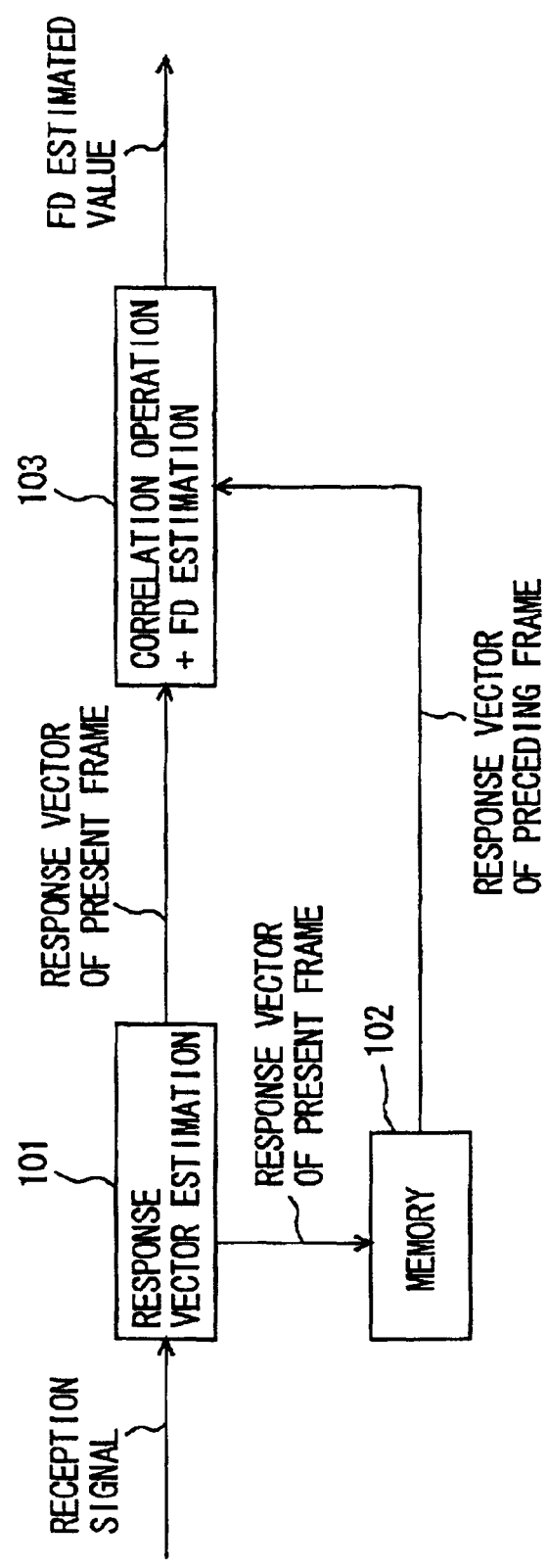
FIG. 7 is a schematic block diagram of a Doppler frequency estimating circuit in accordance with an embodiment of the present invention.

FIG. 7 is a schematic block diagram representing a configuration of a Doppler frequency estimating circuit in accordance with an embodiment of the present invention, used for the estimation of Doppler frequency FD (step S2 of FIG. 6) described above. The principal of operation of the Doppler frequency estimating circuit in accordance with the embodiment of the present invention will be described with reference to FIG. 7.

Referring to FIG. 7, a response vector estimating circuit 101 corresponds to the reception unit SR1 of FIG. 1 and, particularly, to the reception response vector calculator 22 of FIG. 1.

Here, four slots for the up link and four slots for the down link such as shown in FIGS. 3, 4 and 5, namely, a total of 8 slots, will be referred to as one frame. Such frames are continued time sequentially, realizing alternating communication of up and down links.

The response vector estimating circuit 101 applies the method of ensemble averaging described above to the reception signal, so as to estimate the reception response vector at a present frame slot, and applies the result to a correlation operation and Doppler frequency estimating circuit 103 and to a memory 102.

The correlation operation and Doppler frequency estimating circuit 103 calculates correlation value of the reception response vector of the present frame slot estimated by response vector estimating circuit 101 and the reception response vector of the corresponding slot of the preceding frame held in memory 102.

The correlation value α of the reception response vectors of two frames preceding and succeeding in time is defined by the following equation.

$$\alpha = |h_1 h_2^H|/|h_1||h_2|$$

Here, $h_2^H$ represents a complex conjugate of each component of $h_2$ which is further subjected to transposition.

Further, $h_i$ (i=1, 2) represents the reception response vector ($h_{i1}$, $h_{i2}$, $hi_3$, $hi_4$) having phase amplitude information of every antenna element of frame i as its elements.

Though it is difficult to find an accurate correspondence between the correlation values calculated in this manner and the Doppler frequencies, rough correspondence can be found experimentally. For example, if the correlation value is within the range of 1 to 0.95, it is estimated that the Doppler frequency FD is FD=0 Hz. If the correlation value is in the range of 0.95 to 0.80, it is estimated that FD=10 Hz, for example.

The rough correspondence between the reception response vector correlation values and the Doppler frequencies FD obtained experimentally in the above described manner is stored in advance in correlation operation and Doppler frequency estimating circuit 103, and based on the correlation value of the vectors calculated in accordance with the equation above, a corresponding Doppler frequency estimated value is selected and output from circuit 103.

Such a process as shown in FIG. 7 is generally executed in a software manner, using a digital signal processor (DSP), for example. FIG. 8 is a flow chart representing the process performed by the circuit configuration shown in FIG. 7. In the process shown in FIG. 8, a vector correlation value between a reception response vector of the present frame slot and the reception response vector of the corresponding slot of the immediately preceding frame is calculated.

First, in step S31, the reception response vector of the present frame slot is estimated.

Thereafter, in step S32, whether the reception response vector estimated in step S31 is the first estimated reception response vector or not is determined. If it is the first estimated reception response vector, it is stored in the memory (memory 102 of FIG. 7) in step S35.

If it is not the first estimated reception response vector, a correlation value CORR between the reception response vector of the corresponding slot of an immediately preceding frame held in the memory and the reception response vector of the corresponding slot of the present frame estimated in step S31 is calculated in step S33.

In step S34, based on the correspondence between the vector correlation values and the Doppler frequencies FD calculated experimentally in advance and held in the above described manner, the Doppler frequency FD corresponding to the calculated correlation value CORR is estimated and output.

In step S35, the reception response vector of the present frame slot estimated in step S31 is stored in the memory (memory 102 of FIG. 7).

By repeating the above described steps S31 to S35, it is possible to continuously obtain instantaneous vector correlation values between reception response vectors of corresponding slots of two frames that precede and succeed in time, that is, continuous two frames.

Figure 9:
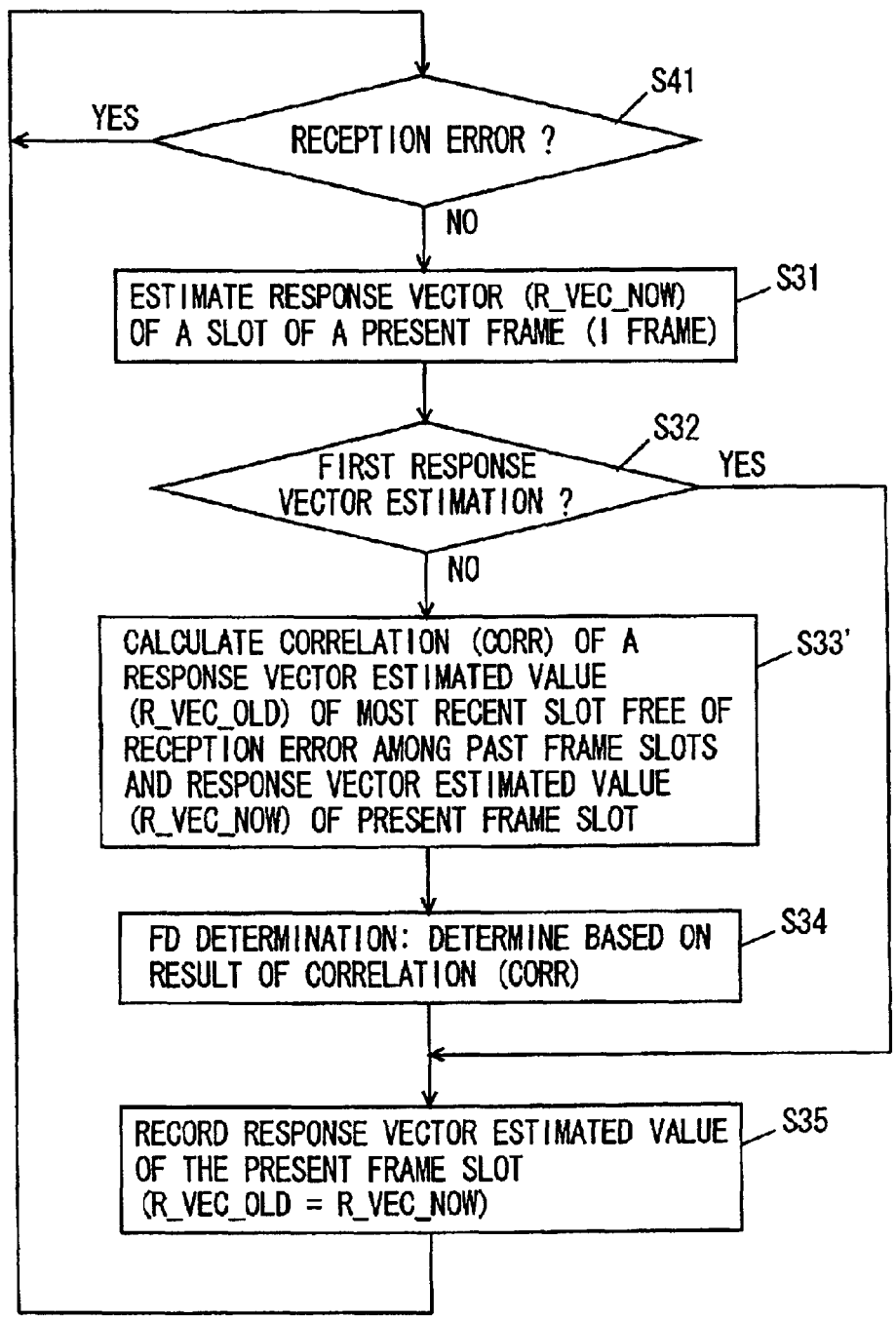
FIG. 9 is a flow chart illustrating another example of the Doppler frequency estimating operation in accordance with an embodiment of the present invention.

FIG. 9 is a flow chart showing a modification of the process shown in FIG. 8.

In FIG. 9, when there is no reception error detected in step S41, the following operation is basically the same as in the example shown in FIG. 8, and therefore, description thereof will not be repeated. When a reception error is detected in step S41, the flow cannot proceed to the next step S31 until detection of the error is stopped.

When detection of the reception error is stopped, the operation from step S31 to step S35 is executed. Here, it is noted that the process of step S33' is different from the example of FIG. 8. More specifically, the response vector estimation of the slot including the reception error is excluded in step S41. Therefore, in step S33', correlation value CORR between the reception response vector of the most recent slot free of any reception error among the past frame slots stored in the memory and the reception response vector of the present frame slot estimated in step S31 is estimated. The following operations are the same as in the example of FIG. 8.

In the example shown in FIG. 9, the influence of the reception error can be eliminated, enabling more accurate estimation of the Doppler frequency.

Figure 10:
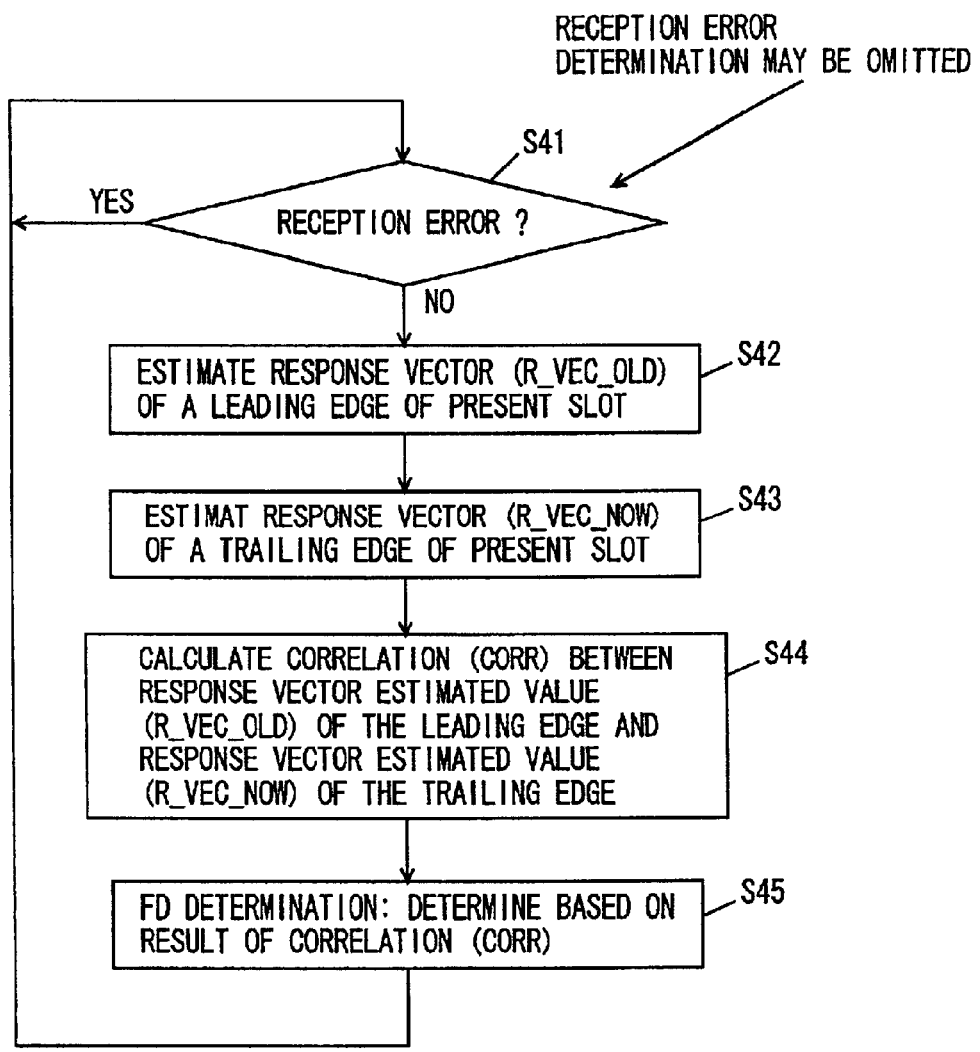
FIG. 10 is a flow chart representing a still further example of the Doppler frequency estimating operation in accordance with an embodiment of the present invention.

FIG. 10 is a flow chart showing another process performed by the circuit configuration shown in FIG. 7. In the process shown in FIG. 10, a vector correlation value between a reception response vector of a former half and a reception response vector of a latter half of one slot is calculated.

First, in step S41, presence/absence of a reception error is determined (step S41 may be omitted). If detection error is not detected, a reception response vector of a leading edge of the present slot is estimated in step S42 and thereafter, a reception response vector at the trailing edge of the present slot is estimated in step S43.

Thereafter, in step S44, a correlation value CORR between the reception response vectors at the leading and trailing edges mentioned above is calculated.

In step S45, based on the correspondence between the vector correlation values and the Doppler frequencies FD found experimentally and held as described above, the Doppler frequency FD corresponding to the calculated correlation value CORR is estimated and output.

As described above, in the embodiments shown in FIGS. 8 to 10, different from the reference signal as an object of correlation value calculation in the prior art, the correlation value of reception response vectors preceding and succeeding in time can be obtained at any timing, and therefore, flexibility of operation to calculate the correlation value can be improved.

Figure 11:
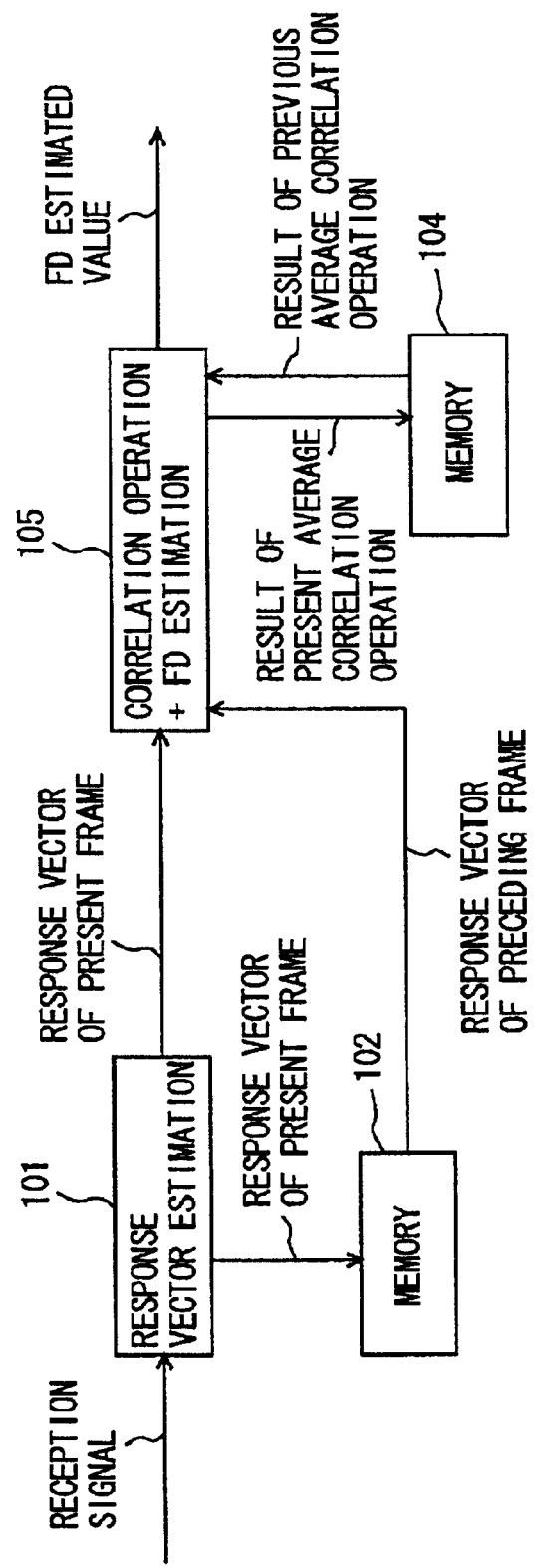
FIG. 11 is a schematic block diagram of a Doppler frequency estimating circuit in accordance with another embodiment of the present invention.

FIG. 11 is a schematic block diagram representing a configuration of a Doppler frequency estimating circuit in accordance with another embodiment of the present invention. The circuit configuration shown in FIG. 11 differs from the circuit configuration shown in FIG. 7 in the following points.

In the example of FIG. 7, correlation operation and Doppler frequency estimating circuit 103 finds an instantaneous correlation value between two reception response vectors preceding and succeeding in time, while in the example of FIG. 11, correlation operation and the Doppler frequency estimating circuit 105 averages calculated correlation values, so as to enable more accurate estimation of the Doppler frequency.

More specifically, referring to FIG. 11, correlation operation and Doppler frequency estimating circuit 105 operates a correlation value between the reception response vector of present frame slot estimated by response vector estimating circuit 101 and the reception response vector of the corresponding slot of the last frame held in memory 102, and calculates an average value between the just operated correlation value and a part average correlation value read from the memory 104 which has been calculated and stored in advance.

Specifically, the present embodiment is configured such that an average value weighted by prescribed weight coefficients is obtained. For example, in circuit 105, an average value between the value obtained by multiplying the past average correlation value stored in memory 104 by a first weight coefficient and a value obtained by multiplying the present correlation value just calculated by a second weight coefficient is calculated.

Here, a large coefficient such as 0.97, for example, is set as the first coefficient, and a small coefficient such as 0.03 is set as the second coefficient.

Based on the average correlation value obtained by the weighted mean, the circuit 105 estimates and outputs the corresponding Doppler frequency, and stores the thus obtained present average correlation value in memory 104.

Figure 12:
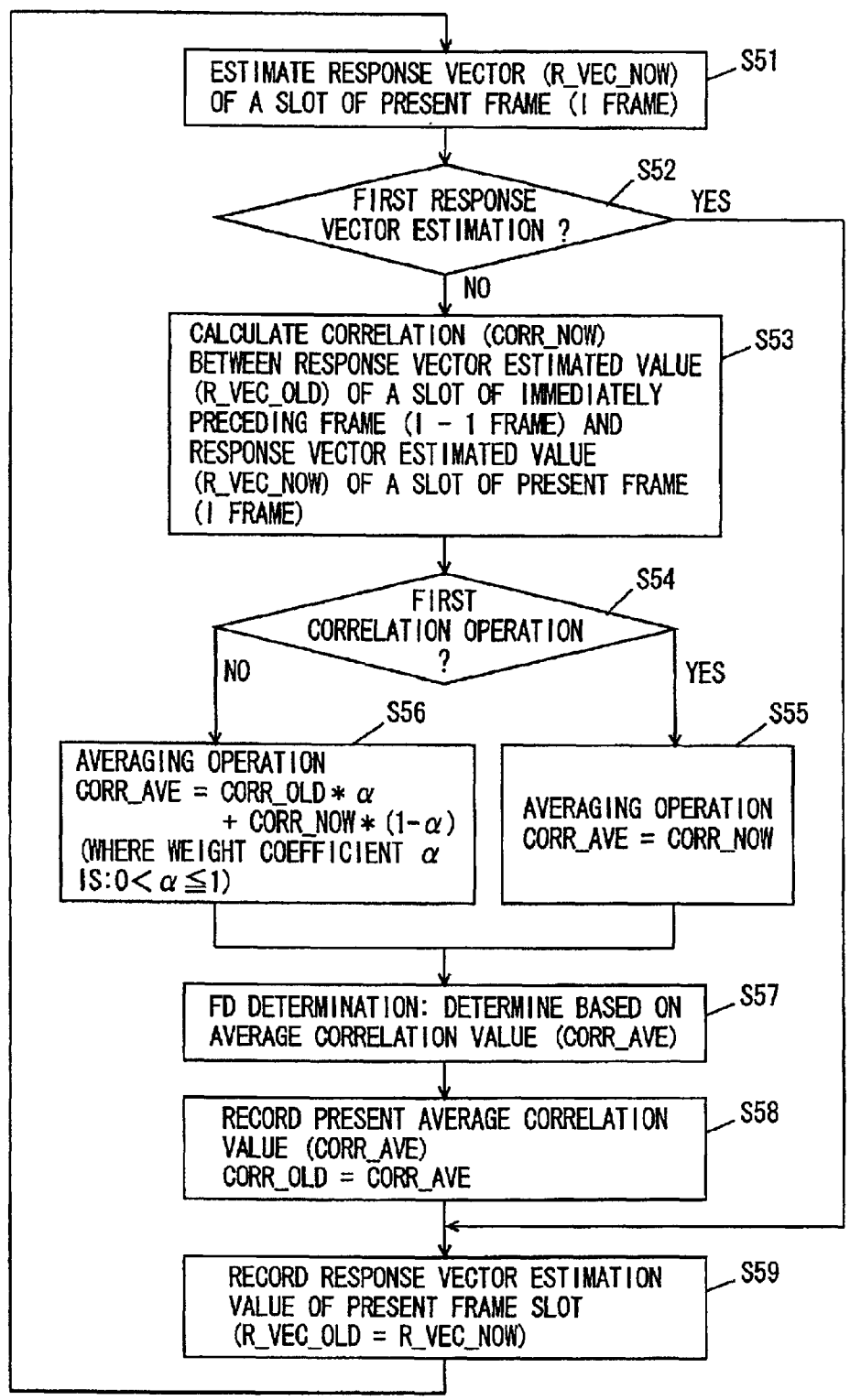
FIG. 12 is a flow chart representing an example of the Doppler frequency estimating operation in accordance with another embodiment of the present invention.

FIG. 12 is a flow chart representing a process performed by the circuit configuration shown in FIG. 11. In the process shown in FIG. 12, a vector correlation value between the reception response vector of the present frame slot and the reception response vector of an immediately preceding frame slot is calculated, and weighted mean of the past correlation value and the present correlation value is further calculated.

First, in step S51, the reception response vector of the present frame slot is estimated in step S51.

Thereafter, in step S52, whether or not the reception response vector estimated in step S51 is the first estimated reception response vector is determined. If it is the first estimated reception response vector, it is stored in the memory (memory 102 of FIG. 11) in step S59.

If it is not the first estimated reception response vector, a correlation value CORR NOW between the reception response vector of the immediately preceding frame slot held in the memory and the reception response vector of the present frame slot estimated in step S51 is calculated in step S53.

Thereafter, in step S54, whether the correlation value calculated in step S53 is the first calculated correlation value or not is determined. If it is the first calculated correlation value, an averaging operation in which correlation value CORR NOW is assumed to be the averaged value CORR AVE is executed in step S55.

If it is not the first calculated correlation value, a weight-averaging process is performed in step S56, in which the past average correlation value CORR OLD read from the memory and the present correlation value CORR NOW are multiplied by weight coefficients $\alpha$ and $1-\alpha$, respectively.

In step S57, based on the correspondence between the average correlation values and the Doppler frequencies FD calculated experimentally and held in advance as described above, a Doppler frequency FD corresponding to the calculated average correlation value CORR AVE is estimated and output.

In step S58, the present average correlation value CORR AVE calculated in step S55 or S56 is stored as the past average correlation value CORR OLD in the memory (memory 104 of FIG. 11).

Further, in step S529, the reception response vector of the present frame slot estimated in step S51 is stored in the memory (memory 102 of FIG. 11).

By repeating the above described steps S51 to S59, it is possible to estimate the Doppler frequency based on the average vector correlation value. As the average of the vector correlation values is taken, even when an error is generated in the instantaneous Doppler frequency because of an abrupt fading, for example, the Doppler frequency can be estimated correctly without the influence of the error. Particularly, by setting the weight coefficients such that the weight for the past correlation value is heavier, even when there is an error generated in the instantaneous Doppler frequency because of an abrupt fading, the Doppler frequency can be estimated more accurately, not influence by the error.

In the example shown in FIGS. 11 and 12, averaging process based on the correlation between the reception response vectors of corresponding slots of the continuous frames is performed. However, as in the example shown in FIGS. 9 and 10, averaging process based on the correlation between the reception response vector of the present frame slot and the reception response vector of the most recent slot free of any reception error among past frame slots may be performed. Alternatively, averaging process based on the correlation between reception response vectors of the former half and the later half of one slot may be performed.

As described above, when the Doppler frequency estimating circuit in accordance with the present invention is used, an optimal extrapolation distance can be selected dependent on whether the Doppler frequency FD for each terminal estimated correctly is high or low, and hence, even when there is an estimation error of the reception response vector of up link, the transmission response vector can be estimated correctly.

The propagation environment of the propagation path can also be represented by a weight estimation error of the signal obtained from the adaptive array output. Such an error is represented by Mean Square Error (MSE) between the signal value obtained from the adaptive array output and the expected desired signal value. The smaller the MSE, the more ideal estimation of the weight vector has been done in the up link, and hence the higher is the accuracy of the adaptive array output signal. By contrast, the larger the MSE, the less optimal the estimated weight vector in the up link, and the lower is the accuracy of the adaptive array output signal. The method of calculating the MSE is well known, and therefore, description thereof will not be given here.

Therefore, dependent on the magnitude of MSE, there will be an estimation error in the reception response vector of the up link, resulting in extrapolation error.

Focusing on the MSE, a principal of operation of another embodiment in accordance with the present invention will be described in the following.

Returning to FIG. 5(A), when MSE is large and there is a large estimation error in the reception response vector, the extrapolation distance is made shorter, because the longer extrapolation distance causes larger extrapolation error. More specifically, when MSE is large, a short distance extrapolation is performed from the reception response vector 2' to the point a represented by X, and the transmission response vector at the point a is estimated and regarded as the correct transmission response vector of the point b represented by x.

When MSE is small and there is a small estimation error in the reception response vector as shown in FIG. 5(B), the extrapolation distance is made relatively long, because extrapolation error is small even when extrapolation distance is long. More specifically, when MSE is small, extrapolation of a relatively long distance from reception response vector 2' to the point c represented by X is performed as shown in FIG. 5(B), the transmission response vector at the point c is estimated and regarded as the correct transmission response vector for the point d represented by X.

Such a process is mainly executed by transmission response vector estimator 32 shown in FIG. 1. FIG. 13 is a flow chart representing the extrapolation process focused on the MSE.

The flow chart shown in FIG. 13 is the same as the flow chart shown in FIG. 6 except the following point.

More specifically, in step S12, MSE is calculated by the known method, and in step S13, by the transmission response vector estimator 32 shown in FIG. 1, the optimal extrapolation parameter, that is, extrapolation distance in accordance with the MSE is determined by the method described with reference to FIG. 5. It is assumed that for this purpose, optimal extrapolation distances determined by previous measurement in accordance with the magnitude of MSE have been held in memory 34 of FIG. 1.

The process other than this point is the same as described with reference to FIG. 6, and therefore, description thereof will not be repeated here.

As described above, in the present embodiment, as the optimal extrapolation distance is selected dependent on the magnitude of MSE, transmission response vector can be estimated correctly even when there is an estimation error in the reception response vector of the up link.

Figure 14:
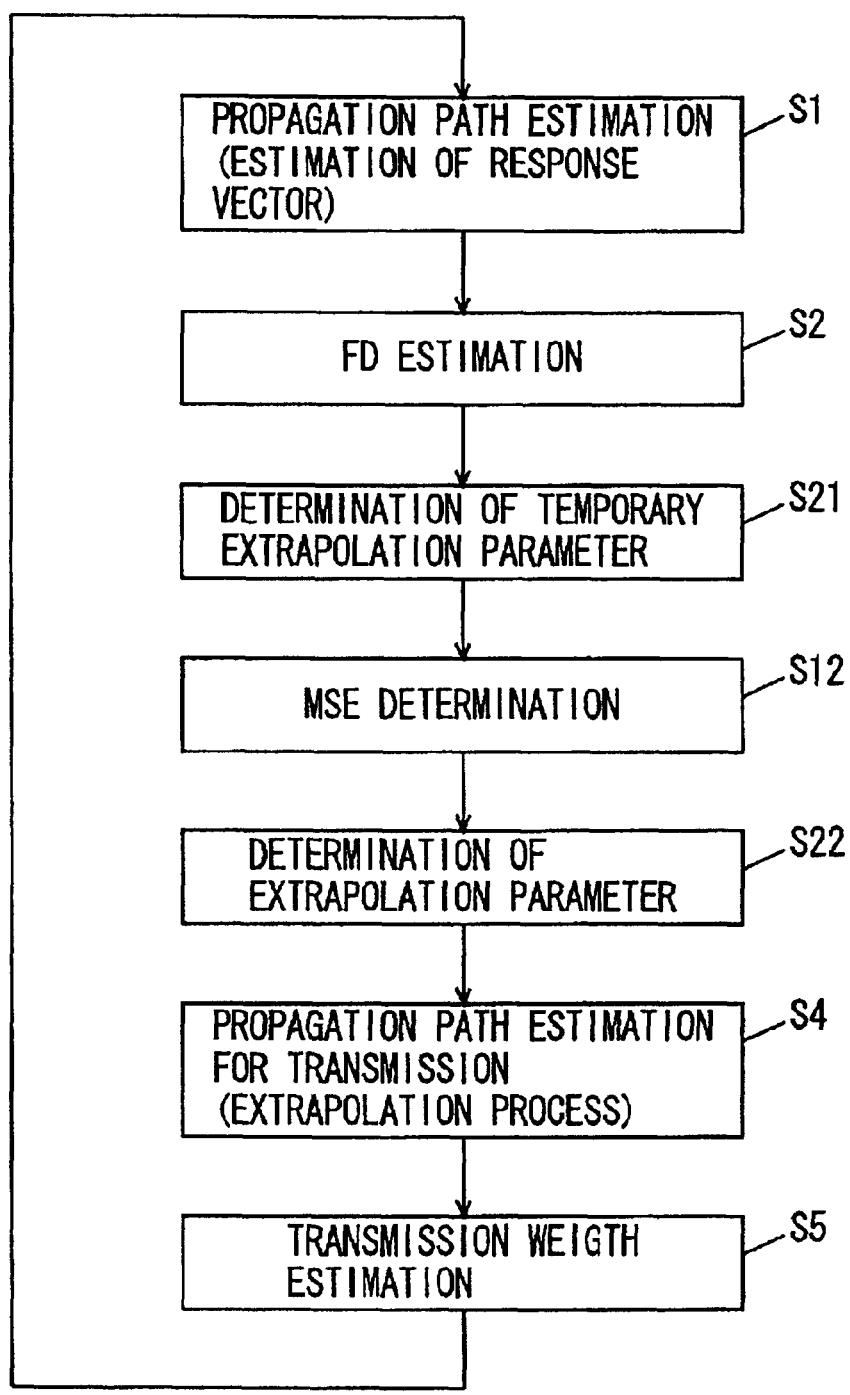
FIG. 14 is a flow chart representing an outline of the extrapolation process in accordance with a still further embodiment of the present invention.
Figure 15:
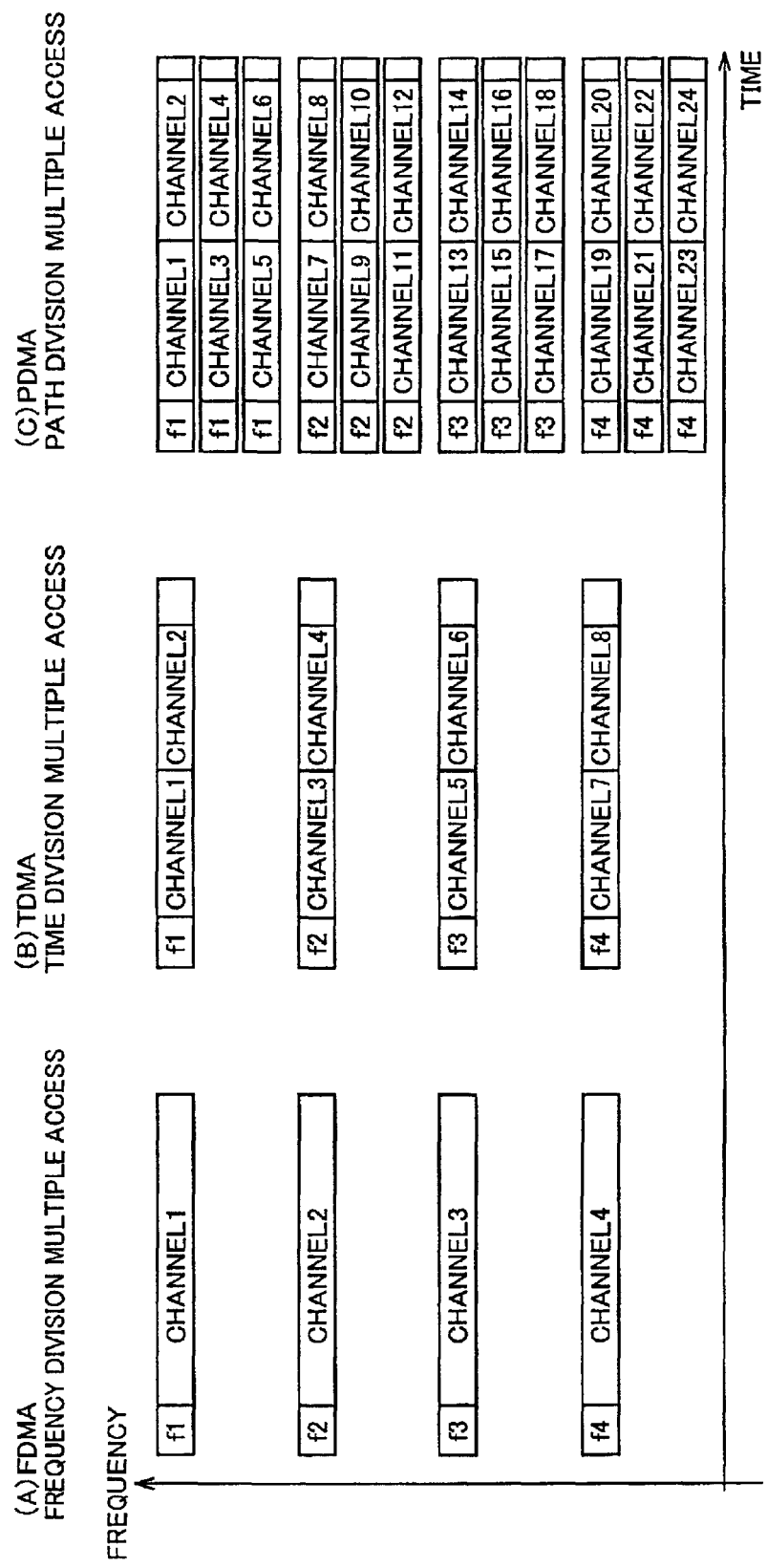
FIG. 15 shows an arrangement of channels in various communication systems including frequency division multiple access, time division multiple access and PDMA.
Figure 16:
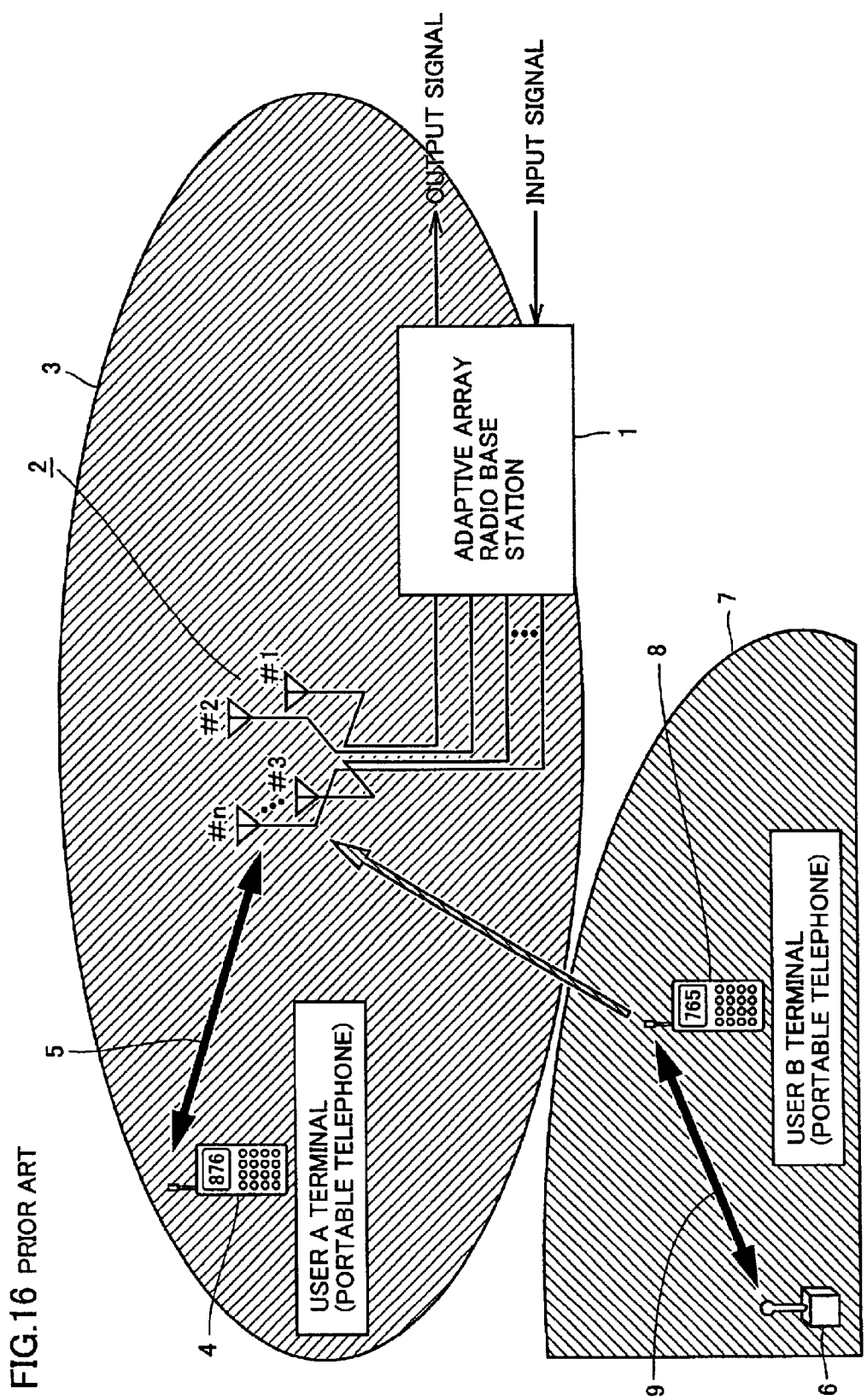
FIG. 16 is a schematic diagram representing a basic operation of an adaptive array radio base station.
Figure 17:
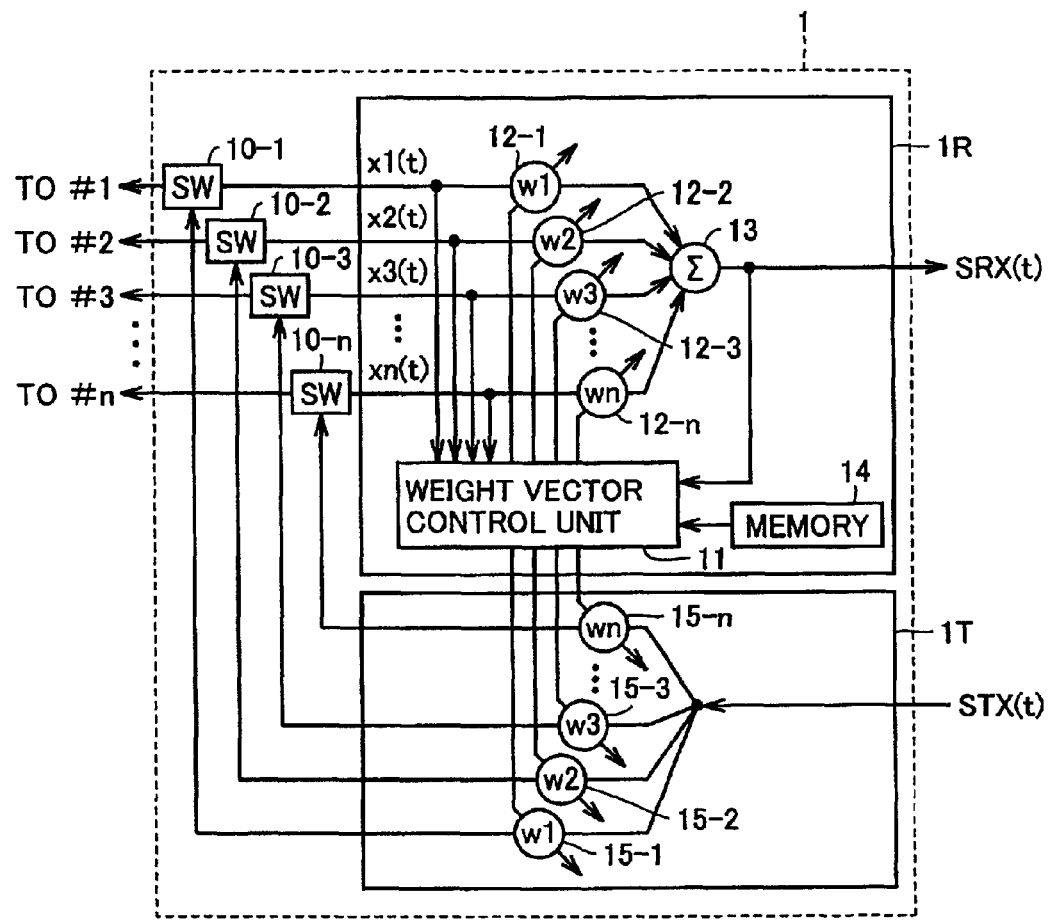
FIG. 17 is a schematic block diagram representing a configuration of an adaptive array radio base station.
Figure 18:
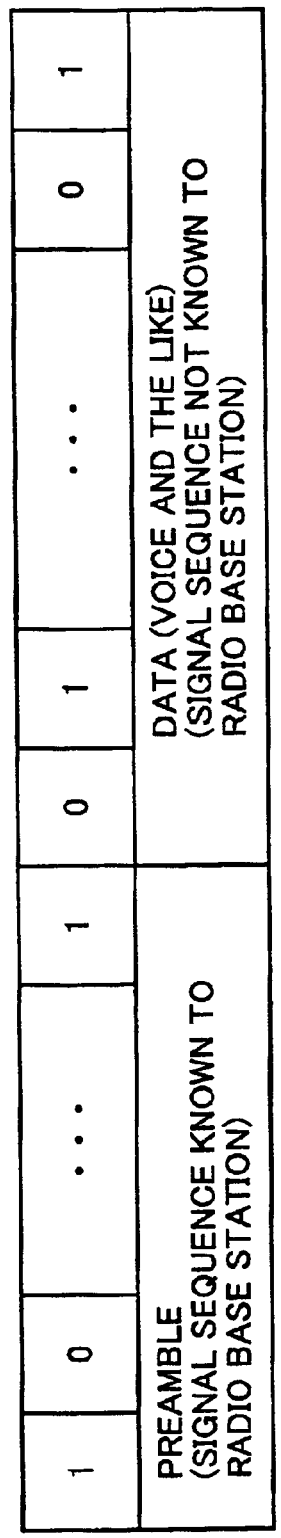
FIG. 18 is a schematic diagram representing a frame configuration of radio signals of a portable telephone.
Figure 19:
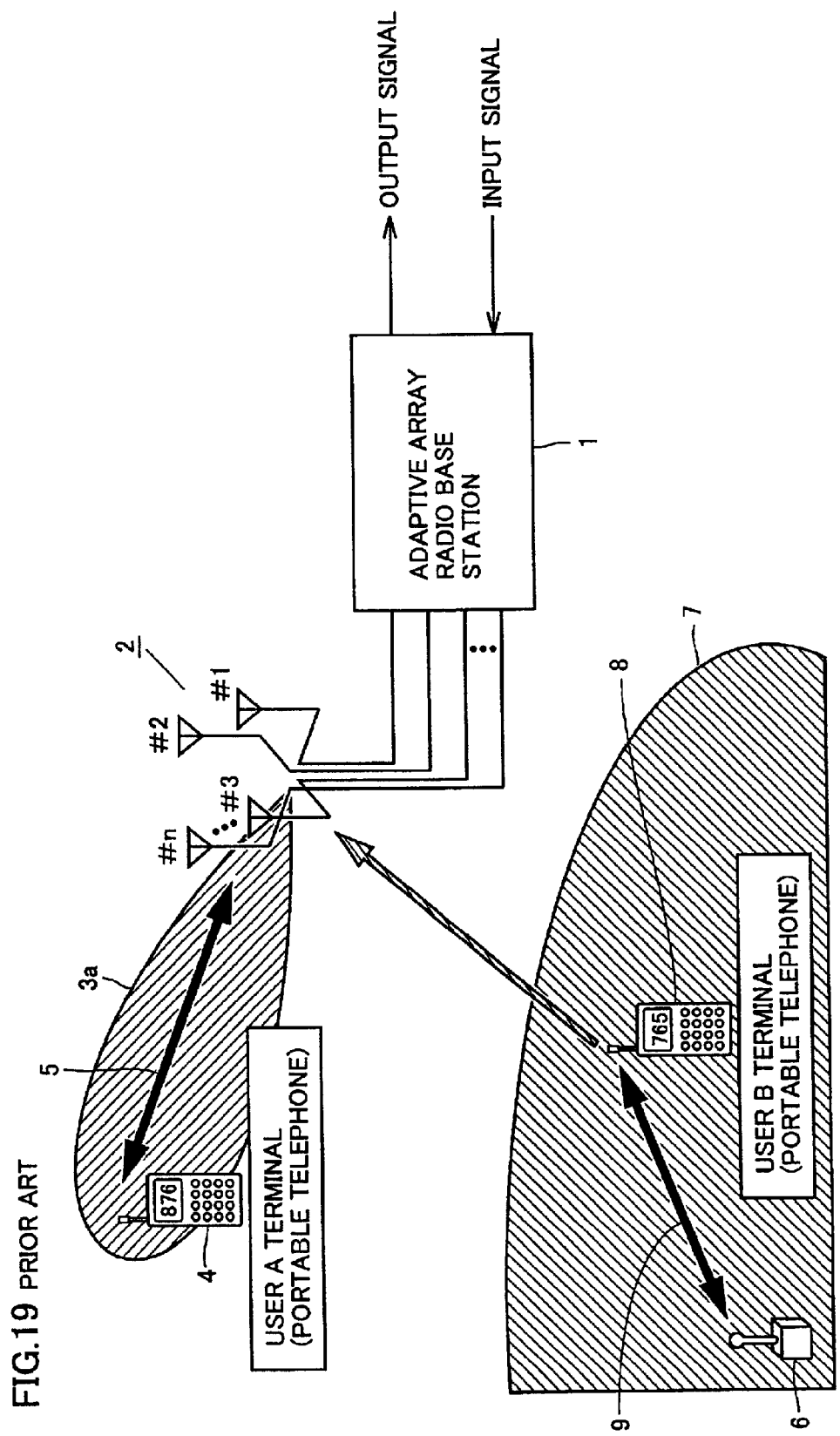
FIG. 19 is an illustration representing transmission/reception of radio signals between an adaptive array radio base station and a user.

FIG. 14 is a flow chart showing the extrapolation process in accordance with a still further embodiment of the present invention. In the embodiment shown in FIG. 6, the optimal extrapolation distance is determined by the Doppler frequency FD, and in the embodiment shown in FIG. 13, the optimal extrapolation distance is determined by the MSE. In the embodiment shown in FIG. 14, which will be described below, the optimal extrapolation distance is determined considering both the Doppler frequency FD and MSE.

More specifically, in the present embodiment, basically, the extrapolation parameter (extrapolation distance) is temporarily determined based on the Doppler frequency FD and, thereafter, the extrapolation parameter is corrected based on the MSE to reach the final determination.

Referring to FIG. 14, steps S1 and S2 are the same as those of the flow chart shown in FIG. 6, and therefore, description thereof will not be repeated. When the Doppler frequency FD is estimated in step S2, an optimal extrapolation distance is selected and temporarily determined, based on the correspondence between the Doppler frequencies FD and the extrapolation distances held in advance in memory 34.

Thereafter, when MSE is estimated in step S12, the extrapolation distance is corrected in accordance with the magnitude of the MSE in step S22. For example, when the MSE is large, it is necessary to correct the extrapolation distance to be shorter, and hence correction is done with a coefficient of X<1. When the MSE is small, it is necessary to correct the extrapolation distance to be longer, and hence correction is done with the coefficient of X>1. It is assumed that such coefficients have been found experimentally and held in memory 34.

When the extrapolation distance is finally determined in step S22 in this manner, the transmission weight is estimated in steps SS4 and S5 that have been already described with reference to FIG. 6.

As described above, in the present invention, a temporary extrapolation distance is selected in accordance with the Doppler frequency FD that has much influence on the extrapolation error, and the extrapolation distance is corrected by the MSE. Therefore, more accurate estimation of the transmission response vector is possible.

The correspondence between the Doppler frequency or the MSE representing the propagation environment and the extrapolation distance differ equipment by equipment because of individual difference of the radio equipment box. Therefore, generally, the correspondence is measured in advance for every radio equipment and determined. If it is assumed that there is only a slight individual difference, a common correspondence may be utilized for a plurality of radio equipments for the overall system.

The extrapolation parameter is not limited to the extrapolation distance described above, and it may be other parameter including inclination of extrapolation.

As described above, according to the present invention, even when there is an estimation error in the reception response vector estimated for the up link, it is possible to correctly estimate the transmission response vector of the down link by selecting a parameter used for the extrapolation process in accordance with the propagation environment, and hence, satisfactory transmission directivity can be realized.

Further, according to the present invention, the Doppler frequency is estimated based not on the reception signal itself but on the correlation value of reception response vectors. Therefore, more accurate estimation of the Doppler frequency is possible without the influence of interfering component of the reception signal, while flexibility of operating process is increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio equipment changing antenna directivity on real time basis and transmitting/receiving signals time divisionally to/from a plurality of terminals, comprising:

a plurality of antennas arranged in a discrete manner; and a transmission circuit and a reception circuit sharing said plurality of antennas for transmitting/receiving signals; wherein said reception circuit includes a reception signal separating unit for separating a signal from a specific terminal among said plurality of terminals, based on signals from said plurality of antennas, when a reception signals is received, and a reception transmission path estimating unit estimating a reception response vector of a propagation path from said specific terminal, based on signals from said plurality of antennas, when said reception signal is received;

said transmission circuit includes transmission propagation path estimating unit estimating a transmission response vector of a transmission path when a transmission signal is transmitted, based on a result of estimation by said reception propagation path estimating unit, and a transmission directivity control unit updating said antenna directivity when said transmission signal is transmitted, based on a result of estimation by said transmission propagation path estimating unit; and said transmission propagation path estimating unit includes an extrapolation processing unit calculating said transmission response vector of a down link slot to said specific terminal, by an extrapolation process based on a plurality of said reception response vectors of up link slots from said specific terminal estimated by said reception propagation path estimating unit, a memory holding a plurality of parameters used for said extrapolation process, determined in advance in accordance with the propagation environment of said propagation path, and a selecting unit estimating the propagation environment of said propagation path, selecting a parameter corresponding to said estimated propagation environment among said held plurality of parameters, and applying the selected parameter to extrapolation process by said extrapolation processing unit.

2. The radio equipment according to claim 1, wherein said parameter is an extrapolation distance in the extrapolation process by said extrapolation processing unit, said memory holds a plurality of extrapolation distances determined in advance in accordance with Doppler frequencies representing said propagation environment, and said selecting unit estimates Doppler frequency of said propagation path, selects the extrapolation distance corresponding to said estimated Doppler frequency among said held plurality of extrapolation distances and applies the selected extrapolation distance to the extrapolation process by said extrapolation processing unit.

3. The radio equipment according to claim 2, wherein
said selecting unit selects a shorter extrapolation distance when the estimated Doppler frequency is lower, and selects a longer extrapolation distance when the estimated Doppler frequency is higher.

4. The radio equipment according to claim 1, wherein
said parameter is an extrapolation distance in an extrapolation process by said extrapolation processing unit, said memory holds a plurality of extrapolation distances determined in advance in accordance with a signal error between said separated signal and an expected desired signal, which represents said propagation environment and
said selecting unit estimates signal error of said propagation path, selects the extrapolation distance corresponding to said estimated signal error among said held plurality of extrapolation distances and applies the selected extrapolation distance to the extrapolation process by said extrapolation processing unit.

5. The radio equipment according to claim 4, wherein
said selecting unit selects a shorter extrapolation distance when the estimated signal error is larger, and selects a larger extrapolation distance when the estimated signal error is smaller.

6. The radio equipment according to claim 1, wherein
said parameter is an extrapolation distance in an extrapolation process by said extrapolation processing unit, said memory holds a plurality of extrapolation distances determined in advance in accordance with Doppler frequencies and a signal error between said separated signal and an expected desired signal, which represent said propagation environment, and said selecting unit estimates the Doppler frequency and the signal error of said propagation path, selects an extrapolation distance corresponding to said estimated Doppler frequency and the signal error among said held plurality of extrapolation distances and applies the selected extrapolation distance to the extrapolation process by said extrapolation processing unit.

7. The radio equipment according to claim 6, where
said selecting unit temporarily selects an extrapolation distance corresponding to said estimated Doppler frequency, and corrects said temporarily selected extrapolation distance in accordance with said estimated signal error.

8. The radio equipment according to claim 1, wherein
the relation between said propagation environment and said plurality of parameters is determined individually for every said radio equipment.

9. The radio equipment according to claim 1, wherein
the relation between said propagation environment and said plurality of parameters is determined commonly to a plurality of said radio equipments.

10. In a radio equipment changing antenna directivity on real time basis and transmitting/receiving signals time divisionally to/from with a plurality of terminals, a Doppler frequency estimating circuit estimating Doppler frequency of a propagation path with a specific terminal, comprising:
a reception signal separating unit separating a signal from said specific terminal among said plurality of terminals based on signals received by a plurality of antennas arranged in a discrete manner;
a reception propagation path estimating unit estimating a reception response vector of a propagation path from said specific terminal, based on signals received by said plurality of antennas;
a correlation operating unit calculating a vector correlation value based on reception response vectors preceding and succeeding in time estimated by said reception propagation path estimating unit; and
an estimating unit estimating a Doppler frequency corresponding to the vector correlation value calculated by said correlation operating unit, based on correspondence between vector correlation values and Doppler frequencies determined in advance experimentally.

11. The Doppler frequency estimating circuit according to claim 10, wherein
said correlation operating unit includes a calculating unit calculating an instantaneous correlation value between said reception response vectors preceding and succeeding in time and outputting calculated value as said vector correlation value.

12. The Doppler frequency estimating circuit according to claim 10, wherein
said correlation operating unit includes
a calculating unit calculating an instantaneous correlation value between said reception response vectors preceding and succeeding in time, and
an averaging unit weight-averaging a past correlation value and a present correlation value calculated by said calculating unit with a prescribed weight coefficient, and outputting an obtained average value as said vector correlation value.

13. The Doppler frequency estimating circuit according to claim 12, wherein
said prescribed weight coefficient is set such that a weight for a past correlation value is large and a weight for a present correlation value is small.

14. The Doppler frequency estimating circuit according to claim 10, wherein
said correlation operating unit calculates a vector correlation value based on a reception response vector of a present frame slot and a reception response vector of an immediately preceding frame slot.

15. The Doppler frequency estimating circuit according to claim 10, wherein
said correlation operating unit calculates a vector correlation value based on a reception response vector of a present frame slot, and a reception response vector of a most recent slot free of any reception error among past frame slots.

16. The Doppler frequency estimating circuit according to claim 10, wherein
said correlation operating unit calculates a vector correlation value based on a reception response vector of a former half and a reception response vector of a latter half of one slot.

17. A radio equipment changing antenna directivity on real time basis and transmitting/receiving signals time divisionally to/from a plurality of terminals, comprising:
a plurality of antennas arranged in a discrete manner; and
a transmission circuit and a reception circuit sharing said plurality of antennas for transmitting/receiving signals; wherein
said reception circuit includes
a reception signal separating unit separating a signal from a specific terminal among said plurality of terminals, based on signals from said plurality of antennas, when a reception signal is received, and
a reception propagation path estimating unit estimating a reception response vector of a propagation path from said specific terminal based on signals from said plurality of antennas, when said reception signal is received;

said transmission circuit includes a transmission propagation path estimating unit estimating a transmission response vector of a propagation path when a transmission signal is transmitted, based on a result of estimation by said reception propagation path estimating unit, and a transmission directivity control unit updating said antenna directivity when said transmission signal is transmitted, based on a result of estimation by said transmission propagation path estimating unit;

said transmission propagation path estimating unit includes an extrapolation processing unit calculating said transmission response vector of a down link slot to said specific terminal, by an extrapolation process based on a plurality of said reception response vectors of up link slots of said specific terminal estimated by said reception propagation path estimating unit, a Doppler frequency estimating unit estimating a Doppler frequency of said propagation path, a memory holding a plurality of parameters used for said extrapolation process, determined in advance in accordance with the Doppler frequencies of said propagation path, and a selecting unit selecting a parameter corresponding to said estimated Doppler frequency among said held plurality of parameters and applying the selected parameter to the extrapolation process by said extrapolation processing unit; and said Doppler frequency estimating unit includes a correlation operating unit calculating a vector correlation value based on reception response vectors preceding and succeeding in time estimated by said reception propagation path estimating unit, and an estimating unit estimating a Doppler frequency corresponding to the vector correlation value calculated by said correlation operating unit, based on correspondence between vector correlation values and Doppler frequencies determined in advance experimentally.

18. The radio equipment according to claim 17, wherein said correlation operating unit includes a calculating unit calculating an instantaneous correlation value between said reception response vectors preceding and succeeding in time and outputting the calculated value as said vector correlation value.

19. The radio equipment according to claim 17, wherein said correlation operating unit includes a calculating unit calculating an instantaneous correlation value between said reception response vectors preceding and succeeding in time, and an averaging unit weight-averaging a past correlation value and a present correlation value calculated by said calculating unit with a prescribed weight coefficient, and outputting an obtained average value as said vector correlation value.

20. The radio equipment according to claim 19, wherein said prescribed weight coefficient is set such that a weight for a past correlation value is large and a weight for a present correlation value is small.

21. The radio equipment according to claim 17, wherein said correlation operating unit calculates a vector correlation value based on a reception response vector of a present frame slot and a reception response vector of an immediately preceding frame slot.

22. The radio equipment according to claim, 17, wherein said correlation operating unit calculates a vector correlation value based on a reception response vector of a present frame slot and a reception response vector of a most recent slot free of any reception error among past frame slots.

23. The radio equipment according to claim 17, wherein said correlation operating unit calculates a vector correlation value based on a reception response vector of a former half and a reception response vector of a latter half of one slot.

* * * * *